US012763557B2

(12) United States Patent
Henton et al.

(10) Patent No.: US 12,763,557 B2
(45) Date of Patent: Oct. 13, 2026

(54) CABLE STRIPPING TOOL

(71) Applicant: MILWAUKEE ELECTRIC TOOL CORPORATION, Brookfield, WI (US)

(72) Inventors: Nolan J. Henton, Milwaukee, WI (US); Justin Miller, Richfield, WI (US); Joseph J. Pechstein, West Bend, WI (US); Matthew R. Wolf, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 366 days.

(21) Appl. No.: 18/473,369

(22) Filed: Sep. 25, 2023

(65) Prior Publication Data

US 2024/0106210 A1 Mar. 28, 2024

Related U.S. Application Data

(60) Provisional application No. 63/409,257, filed on Sep. 23, 2022.

(51) Int. Cl.
*H02G 1/12* (2006.01)
*H02G 1/14* (2006.01)

(52) U.S. Cl.
CPC ............ *H02G 1/126* (2013.01); *H02G 1/127* (2013.01); *H02G 1/14* (2013.01)

(58) Field of Classification Search
CPC ...... H02G 1/12; H02G 1/1202; H02G 1/1248; H02G 1/1251; H02G 1/1258; H02G 1/126; H02G 1/1265
See application file for complete search history.

(56) References Cited

U.S. PATENT DOCUMENTS

| | | | | |
|---|---|---|---|---|
| 2,176,646 A | | 10/1939 | Thatcher | |
| 2,396,442 A | | 3/1946 | Shaver et al. | |
| 2,687,560 A | | 8/1954 | Palley | |
| 3,273,236 A | | 9/1966 | McDowell | |
| 3,360,808 A | * | 1/1968 | Arnold ................ | H02G 1/1204 140/124 |
| 3,581,608 A | | 6/1971 | Baker | |

(Continued)

FOREIGN PATENT DOCUMENTS

| | | |
|---|---|---|
| CN | 201829799 U | 5/2011 |
| CN | 202721388 U | 2/2013 |

(Continued)

*Primary Examiner* — David B. Thomas
(74) *Attorney, Agent, or Firm* — Michael Best & Friedrich LLP

(57) ABSTRACT

A cable stripping tool removes a cable jacket from a cable to expose a plurality of neutral wires, the cable stripping tool including a housing, a frame coupled to the housing, a mandrel extending from the housing and rotatable about a first axis, and a motor supported by the housing and operably coupled to the mandrel to rotate the mandrel about the first axis. The frame supports the cable stripping tool on the cable and the mandrel engages a starter wire of the plurality of neutral wires. Rotation of the mandrel by the motor winds the starter wire around the mandrel such that the cable jacket is torn by the starter wire. The cable stripping tool further includes a termination tool configured to score the cable jacket at a desired distance from an end of the cable.

22 Claims, 16 Drawing Sheets

(56) References Cited

U.S. PATENT DOCUMENTS

| | | | | |
|---|---|---|---|---|
| 3,816,915 | A | 6/1974 | Bieganski | |
| 3,959,877 | A | 6/1976 | Zorzenon | |
| 4,027,557 | A | 6/1977 | Stepan | |
| 4,062,110 | A | 12/1977 | Alvarez | |
| 4,074,544 | A | 2/1978 | Luthi | |
| 4,267,636 | A | 5/1981 | Ducret | |
| 4,736,501 | A | 4/1988 | Fujimoto | |
| 4,876,792 | A | 10/1989 | Black | |
| 4,901,438 | A | 2/1990 | Gibney | |
| 4,979,307 | A | 12/1990 | Ste. Marie | |
| 4,987,801 | A | 1/1991 | Brown | |
| 5,070,615 | A | 12/1991 | Michael, III | |
| 5,140,873 | A | 8/1992 | Schwartzman | |
| 5,230,260 | A * | 7/1993 | Bell | H02G 1/12 29/403.3 |
| 5,361,496 | A * | 11/1994 | DeBoalt | H02G 1/1229 30/180 |
| 5,581,885 | A | 12/1996 | Dalton | |
| 5,673,486 | A | 10/1997 | Brown | |
| 5,749,270 | A * | 5/1998 | Bourbeau | H02G 1/1226 29/566.4 |
| 5,809,652 | A * | 9/1998 | Ducret | H02G 1/1231 30/90.9 |
| 5,950,505 | A | 9/1999 | Locher | |
| 6,044,744 | A | 4/2000 | Eslambolchi et al. | |
| 6,311,600 | B1 | 11/2001 | Lo et al. | |
| 6,330,839 | B1 | 12/2001 | Amrein | |
| 6,370,759 | B1 | 4/2002 | Shimizu | |
| 6,381,850 | B1 | 5/2002 | Warner | |
| 6,401,570 | B1 * | 6/2002 | Nadeau | H02G 1/1204 81/9.4 |
| 6,561,061 | B1 | 5/2003 | Stepan | |
| 6,668,458 | B1 | 12/2003 | Schoenleber | |
| 7,228,763 | B2 | 6/2007 | Hughes et al. | |
| 8,177,582 | B2 * | 5/2012 | Amidon | H01R 43/28 29/857 |
| 8,468,686 | B2 * | 6/2013 | Ponzio | H02K 15/33 29/736 |
| 8,544,364 | B2 | 10/2013 | Michaels | |
| 8,739,657 | B2 | 6/2014 | Nakamura | |
| 9,270,095 | B2 | 2/2016 | Johnston | |
| 9,520,700 | B2 | 12/2016 | Stepan et al. | |
| 9,593,446 | B2 * | 3/2017 | Nater | D07B 1/0686 |
| 10,033,167 | B1 | 7/2018 | Devita et al. | |
| 10,256,612 | B2 | 4/2019 | Houser et al. | |
| 10,404,044 | B2 | 9/2019 | Smith | |
| 10,418,796 | B2 * | 9/2019 | Nelson | H02G 1/1224 |
| 10,978,860 | B1 | 4/2021 | Wendt | |
| 11,258,238 | B2 | 2/2022 | Zick et al. | |
| 11,261,564 | B2 * | 3/2022 | Shibao | D07B 1/148 |
| 11,276,993 | B2 | 3/2022 | Sedlacek | |
| 11,450,449 | B2 | 9/2022 | Silberbauer | |
| 11,539,193 | B2 | 12/2022 | Smith | |
| 2005/0066528 | A1 | 3/2005 | Ducret | |
| 2006/0242840 | A1 * | 11/2006 | Sullivan | H01R 43/015 30/142 |
| 2009/0308483 | A1 * | 12/2009 | James | B21F 7/00 140/120 |
| 2012/0124841 | A1 | 5/2012 | Ducret | |
| 2012/0222292 | A1 * | 9/2012 | Velthuis | H01F 41/068 30/296.1 |
| 2013/0000128 | A1 * | 1/2013 | Johnston | H02G 1/1239 83/13 |
| 2013/0074345 | A1 | 3/2013 | Zick et al. | |
| 2018/0062362 | A1 | 3/2018 | Muston | |
| 2018/0183221 | A1 | 6/2018 | Wilcox | |
| 2019/0363525 | A1 * | 11/2019 | Franssen | H02G 1/1236 |
| 2020/0076172 | A1 | 3/2020 | Weber et al. | |
| 2020/0373745 | A1 | 11/2020 | Galindo Gonzalez | |
| 2022/0158423 | A1 | 5/2022 | Sedlacek | |
| 2023/0022732 | A1 * | 1/2023 | Gundel | G01N 21/952 |
| 2023/0023163 | A1 * | 1/2023 | Gundel | H04N 23/55 |
| 2023/0035721 | A1 * | 2/2023 | Gundel | G01B 11/14 |
| 2023/0070686 | A1 | 3/2023 | Smith | |
| 2023/0253770 | A1 * | 8/2023 | Eisele | H02G 1/1265 83/874 |

FOREIGN PATENT DOCUMENTS

| | | | |
|---|---|---|---|
| CN | 203813339 | U | 9/2014 |
| CN | 203967639 | U | 11/2014 |
| CN | 204012489 | U | 12/2014 |
| CN | 104393540 | A | 3/2015 |
| CN | 204559017 | U | 8/2015 |
| CN | 204885796 | U | 12/2015 |
| CN | 205159941 | U | 4/2016 |
| CN | 105591328 | A | 5/2016 |
| CN | 105680377 | A | 6/2016 |
| CN | 105790168 | A | 7/2016 |
| CN | 205565538 | U | 9/2016 |
| CN | 205944912 | U | 2/2017 |
| CN | 206041377 | U | 3/2017 |
| CN | 106877119 | A | 6/2017 |
| CN | 106998047 | A | 8/2017 |
| CN | 206432551 | U | 8/2017 |
| CN | 107240894 | A | 10/2017 |
| CN | 206775019 | U | 12/2017 |
| CN | 107658801 | A | 2/2018 |
| CN | 107681562 | A | 2/2018 |
| CN | 107785816 | A | 3/2018 |
| CN | 108054681 | A | 5/2018 |
| CN | 108321732 | A | 7/2018 |
| CN | 108429197 | A | 8/2018 |
| CN | 108471194 | A | 8/2018 |
| CN | 108539668 | A | 9/2018 |
| CN | 108666937 | A | 10/2018 |
| CN | 108711789 | A | 10/2018 |
| CN | 207977674 | U | 10/2018 |
| CN | 108808575 | A | 11/2018 |
| CN | 108899811 | A | 11/2018 |
| CN | 208226464 | U | 12/2018 |
| CN | 109119946 | A | 1/2019 |
| CN | 109244936 | A | 1/2019 |
| CN | 109244967 | A | 1/2019 |
| CN | 109274041 | A | 1/2019 |
| CN | 109473914 | A | 3/2019 |
| CN | 109510118 | A | 3/2019 |
| CN | 109510120 | A | 3/2019 |
| CN | 109616957 | A | 4/2019 |
| CN | 109616961 | A | 4/2019 |
| CN | 109638733 | A | 4/2019 |
| CN | 109687354 | A | 4/2019 |
| CN | 109861059 | A | 6/2019 |
| CN | 208955403 | U | 6/2019 |
| CN | 110048342 | A | 7/2019 |
| CN | 209104700 | U | 7/2019 |
| CN | 209150622 | U | 7/2019 |
| CN | 110137864 | A | 8/2019 |
| CN | 110224345 | A | 9/2019 |
| CN | 110350448 | A | 10/2019 |
| CN | 209526439 | U | 10/2019 |
| CN | 110518502 | A | 11/2019 |
| CN | 209786654 | U | 12/2019 |
| CN | 110676768 | A | 1/2020 |
| CN | 110676769 | A | 1/2020 |
| CN | 110707608 | A | 1/2020 |
| CN | 209896596 | U | 1/2020 |
| CN | 209948542 | U | 1/2020 |
| CN | 110854749 | A | 2/2020 |
| CN | 110943355 | A | 3/2020 |
| CN | 110994480 | A | 4/2020 |
| CN | 111082370 | A | 4/2020 |
| CN | 210350649 | U | 4/2020 |
| CN | 111130025 | A | 5/2020 |
| CN | 111313334 | A | 6/2020 |
| CN | 210838715 | U | 6/2020 |
| CN | 111431102 | A | 7/2020 |
| CN | 210939453 | U | 7/2020 |
| CN | 211208882 | U | 8/2020 |
| CN | 211266279 | U | 8/2020 |
| CN | 211266280 | U | 8/2020 |

(56) References Cited

FOREIGN PATENT DOCUMENTS

| | | | | | |
|---|---|---|---|---|---|
| CN | 211320784 | U | | 8/2020 | |
| CN | 211351528 | U | | 8/2020 | |
| CN | 111614027 | A | | 9/2020 | |
| CN | 111725743 | A | | 9/2020 | |
| CN | 211629740 | U | | 10/2020 | |
| CN | 111934242 | A | | 11/2020 | |
| CN | 111969502 | A | | 11/2020 | |
| CN | 111987650 | A | | 11/2020 | |
| CN | 112018667 | A | | 12/2020 | |
| CN | 112103754 | A | | 12/2020 | |
| CN | 112152156 | A | | 12/2020 | |
| CN | 212435246 | U | | 1/2021 | |
| CN | 112332320 | A | | 2/2021 | |
| CN | 112398041 | A | | 2/2021 | |
| CN | 112490951 | A | | 3/2021 | |
| CN | 112490953 | A | | 3/2021 | |
| CN | 112600132 | A | | 4/2021 | |
| CN | 112757359 | A | | 5/2021 | |
| CN | 112803310 | A | | 5/2021 | |
| CN | 112847543 | A | | 5/2021 | |
| CN | 112864959 | A | | 5/2021 | |
| CN | 113013793 | A | | 6/2021 | |
| CN | 113300287 | A | | 8/2021 | |
| CN | 213906135 | U | | 8/2021 | |
| CN | 214013715 | U | | 8/2021 | |
| CN | 214043257 | U | | 8/2021 | |
| CN | 113394719 | A | | 9/2021 | |
| CN | 113437703 | A | | 9/2021 | |
| CN | 113500651 | A | | 10/2021 | |
| CN | 214479148 | U | | 10/2021 | |
| CN | 113594829 | A | | 11/2021 | |
| CN | 214644019 | U | | 11/2021 | |
| CN | 214850162 | U | | 11/2021 | |
| CN | 113794165 | A | | 12/2021 | |
| CN | 113794166 | A | | 12/2021 | |
| CN | 113922287 | A | | 1/2022 | |
| CN | 113937672 | A | | 1/2022 | |
| CN | 113991551 | A | | 1/2022 | |
| CN | 113991554 | A | | 1/2022 | |
| CN | 114094505 | A | | 2/2022 | |
| CN | 114094507 | A | | 2/2022 | |
| CN | 215772287 | U | | 2/2022 | |
| CN | 215817276 | U | | 2/2022 | |
| CN | 215897167 | U | | 2/2022 | |
| CN | 216289926 | U | | 4/2022 | |
| CN | 114798969 | A | | 7/2022 | |
| CN | 114825186 | A | | 7/2022 | |
| CN | 115000887 | A | | 9/2022 | |
| CN | 115051289 | A | | 9/2022 | |
| CN | 115065001 | A | | 9/2022 | |
| CN | 115065002 | A | | 9/2022 | |
| CN | 115085100 | A | | 9/2022 | |
| CN | 115133459 | A | | 9/2022 | |
| CN | 115149465 | A | | 10/2022 | |
| CN | 115173324 | A | | 10/2022 | |
| CN | 115173327 | A | | 10/2022 | |
| CN | 115186774 | A | | 10/2022 | |
| CN | 115241806 | A | | 10/2022 | |
| CN | 115241811 | A | | 10/2022 | |
| CN | 217545424 | U | | 10/2022 | |
| CN | 115275880 | A | | 11/2022 | |
| CN | 218449207 | U | | 2/2023 | |
| CN | 115733098 | A | | 3/2023 | |
| CN | 115764723 | A | | 3/2023 | |
| CN | 218648477 | U | | 3/2023 | |
| DE | 2220678 | A1 | | 1/1973 | |
| DE | 4410967 | A1 | | 10/1995 | |
| DE | 29919682 | U1 | | 3/2000 | |
| DE | 10029786 | A1 | * | 4/2002 | ........... H02G 1/1221 |
| DE | 102007021638 | B3 | | 10/2008 | |
| DE | 202021103485 | U1 | | 8/2021 | |
| DE | 102020126487 | A1 | | 4/2022 | |
| WO | WO9738477 | A1 | | 10/1997 | |
| WO | WO9934493 | A1 | | 7/1999 | |
| WO | WO2013009167 | A1 | | 1/2013 | |
| WO | WO2021068590 | A1 | | 4/2021 | |
| WO | WO2022036771 | A1 | | 2/2022 | |
| WO | WO2022073743 | A1 | | 4/2022 | |
| WO | WO2022105311 | A1 | | 5/2022 | |
| WO | WO2022127982 | A1 | | 6/2022 | |
| WO | WO2023031395 | A1 | | 3/2023 | |

* cited by examiner

CABLE STRIPPING TOOL

CROSS-REFERENCE TO RELATED APPLICATIONS

This application claims priority to U.S. Provisional Patent Application No. 63/409,257, filed Sep. 23, 2022, the entire contents of which are incorporated herein by reference.

FIELD OF THE INVENTION

The present invention relates to a cable stripping tool.

BACKGROUND

Electrical cables 10 (e.g., cables) (FIG. 1), such as underground cables, are commonly used to transfer electrical energy from power sources, such as a power grid, a power plant, and/or a generator. Other types of electrical cables 10 may be used to transfer an electrical signal from one location to another. Such electrical cables 10 often include a plurality of conductive wires 14 (e.g., making up a conductive core) surrounded by one or more insulating materials 18 (e.g., a rubber sheath) and a network of concentric neutral wires 22. The conductive core 14, the insulating material(s) 18, and the neutral wires 22 are encased by a rigid insulation layer 26 (e.g., a cable jacket) that prevents interference caused by direct contact with the conductor core 14, and that shields the conductor core 14 and neutral wires 22 from the environment. The rigidity of the cable jacket 26 may make such cables 10 unwieldy and/or difficult to bend or to reshape.

SUMMARY OF THE INVENTION

The present invention provides, in one aspect, a cable stripping tool including a frame, a motor supported by the frame, and a mandrel supported by the frame and operably coupled to the motor. The cable stripping tool also includes a starter tool.

The present invention provides, in another aspect, a cable stripping tool including a frame, a motor supported by the frame, and a mandrel supported by the frame and operably coupled to the motor. The cable stripping tool also includes a termination tool.

The present invention provides, in yet another aspect, a cable stripping tool including a frame, a motor supported by the frame, and a mandrel supported by the frame and operably coupled to the motor. The cable stripping tool also includes a braid tool.

The present invention provides, in another aspect, a cable stripping tool for removing a cable jacket from a cable to expose a plurality of neutral wires, the cable stripping tool including a housing, a frame coupled to the housing, a mandrel extending from the housing and rotatable about a first axis, and a motor supported by the housing and operably coupled to the mandrel to rotate the mandrel about the first axis. The frame supports the cable stripping tool on the cable and the mandrel engages a starter wire of the plurality of neutral wires. Rotation of the mandrel by the motor winds the starter wire around the mandrel such that the cable jacket is torn by the starter wire. The cable stripping tool further includes a termination tool configured to score the cable jacket at a desired distance from an end of the cable.

The present invention provides, in another aspect, a cable stripping tool for removing a cable jacket from a cable to expose a plurality of neutral wires, the cable stripping tool including a housing, a frame coupled to the housing, a mandrel extending from the housing and rotatable about a first axis, a starter tool that exposes an end of a starter wire of the plurality of neutral wires, a wire slot configured to engage the starter wire, and a motor supported by the housing and operably coupled to the mandrel to rotate the mandrel about the first axis. The frame supports the cable stripping tool on the cable. The wire slot is positioned on the mandrel, and rotation of the mandrel by the motor winds the starter wire around the mandrel such that the cable jacket is torn by the starter wire.

The present invention provides, in another aspect, a cable stripping tool for removing a cable jacket from a cable to expose a plurality of neutral wires, the cable stripping tool including a housing, a frame coupled to the housing, a mandrel extending from the housing and rotatable about a first axis, and a motor supported in the housing and operably coupled to the mandrel to rotate the mandrel about the first axis. The frame supports the cable stripping tool on the cable. The mandrel includes a slot that engages a starter wire of the plurality of neutral wires. Rotation of the mandrel by the motor winds the starter wire around the mandrel such that the cable jacket is torn by the starter wire. The cable stripping tool further includes a braid tool configured to wind the plurality of neutral wires exposed by removing the cable jacket together into a strand.

Other features and aspects of the invention will become apparent by consideration of the following detailed description and accompanying drawings.

Figure 1:
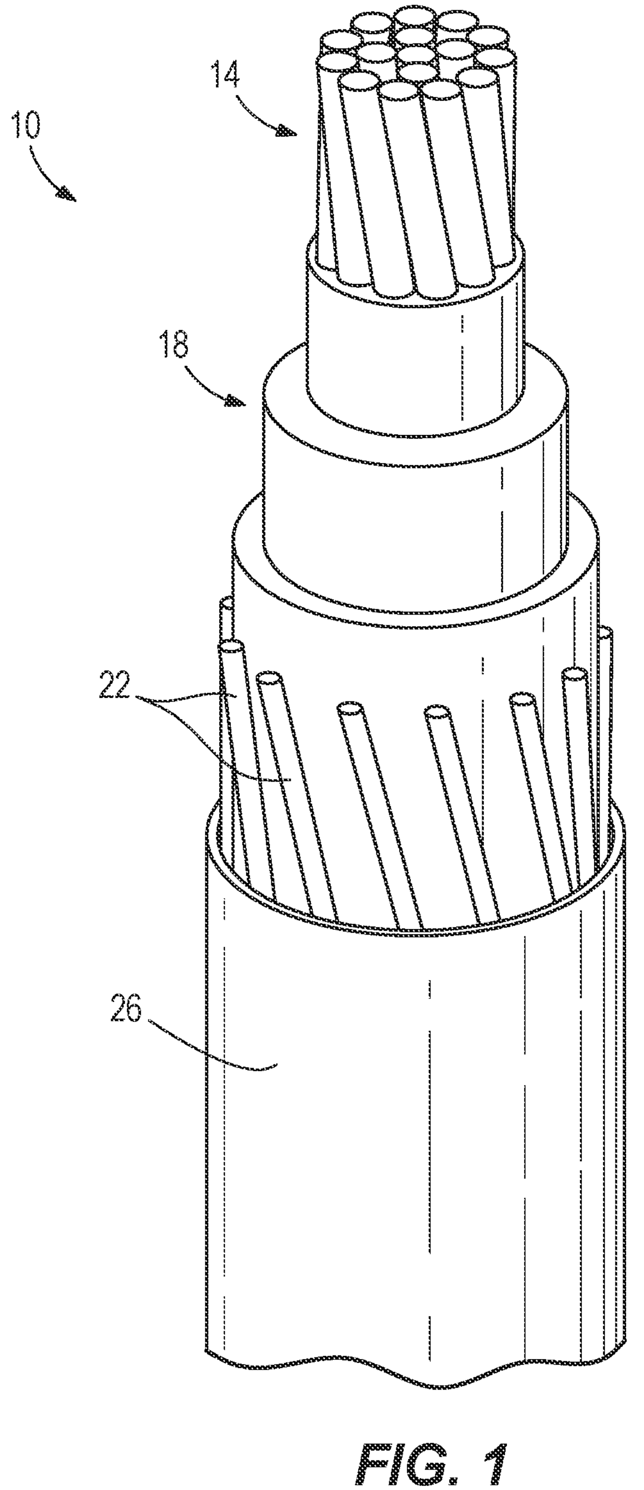
FIG. 1 is a side view of a cable with portions removed.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

As discussed above, FIG. 1 illustrates an exemplary electrical cable 10 including a plurality of conductive wires 14 forming a conductive core, a rubber sheath 18 surrounding the conductive core 14, and a plurality of neutral wires 22 arranged concentrically around the rubber sheath 18. A cable jacket 26 encases the neutral wires 22 to prevent interference and damage. An operator may need access to the neutral wires 22 to form an electrical connection between two lengths of cable 10. Additionally, or alternatively, the cable jacket 26 may need to be removed in order to position the cable 10 in the correct configuration.

FIGS. 2-32 illustrate various embodiments of components of a cable stripping tool 50 or cable stripping system 50 used to remove the cable jacket 26 from a portion of a cable 10, such as the exemplary cable shown in FIG. 1, to expose the plurality of neutral wires 22. The cable stripping system 50 may include a stripping tool 100 (FIGS. 2-6), a starter tool 104 (FIGS. 7-23), and a termination tool 108 (FIGS. 25-29). When cables 10 need to be cut or spliced, at least a portion of the cable jacket 26 is removed using the cable stripping system 50 to expose the neutral wires 22 of the cable 10. First, the user measures a distance between an outer end (or first end) of the cable 10 and a location spaced apart from the end of the cable 10, also referred to as an inner end (or second end) of the portion of the cable 10 being stripped. This distance is the length of cable jacket 26 that needs to be removed to expose the appropriate length of the neutral wires 22. The user may create a score mark on the cable jacket 26 using, for example, the termination tool 108 (FIGS. 25-29) at the inner end of the portion of cable 10. The score mark is a cut in the cable jacket 26 that goes through the cable jacket 26 or is deep enough to allow the user to tear and remove the cable jacket 26 by hand once the cable stripping process is over.

Once the cable jacket 26 has been scored, the user then extracts an end of one of the plurality of neutral wires 22, from the end of the cable 10 using, for example, a starter tool 104 (FIGS. 7-23). The extracted wire may be referred to herein as a starter wire 22'. Any of the plurality of neutral wires 22 may be used as the starter wire 22'. Previously, the starter tool 104 may have included pliers to grip and pull an end of the starter wire 22' to extract the starter wire 22' and begin tearing the cable jacket 26. Other embodiments of starter tools 104 specifically designed for the purpose are described in more detail below. Once a length of the starter wire 22' is exposed, the stripping tool 100 (FIGS. 2-6) may be positioned to ride along the cable 10 and the starter wire 22' may be coupled to the stripping tool 100. The stripping tool 100 operates to pull the starter wire 22', tearing the cable jacket 26 in a spiral pattern until the tear reaches the score created by the termination tool 108. The cable jacket 26 can then be easily removed by the user by hand.

In some embodiments, the plurality of neutral wires 22 all need to be coupled to another cable or set of wires. To simplify the connection process, the cable stripping system 50 includes a braid tool 112 (FIGS. 30-32) that winds or braids the exposed portions of the plurality of neutral wires 22 together to create a strand, which can then easily be coupled to another strand, cable, or other electrical connection. While certain features are disclosed in particular reference to certain embodiments of the cable stripping system 50 and are described separately from other features, the features of any embodiment may be incorporated into the design of another embodiment without departing from the scope of this disclosure.

Figure 4:
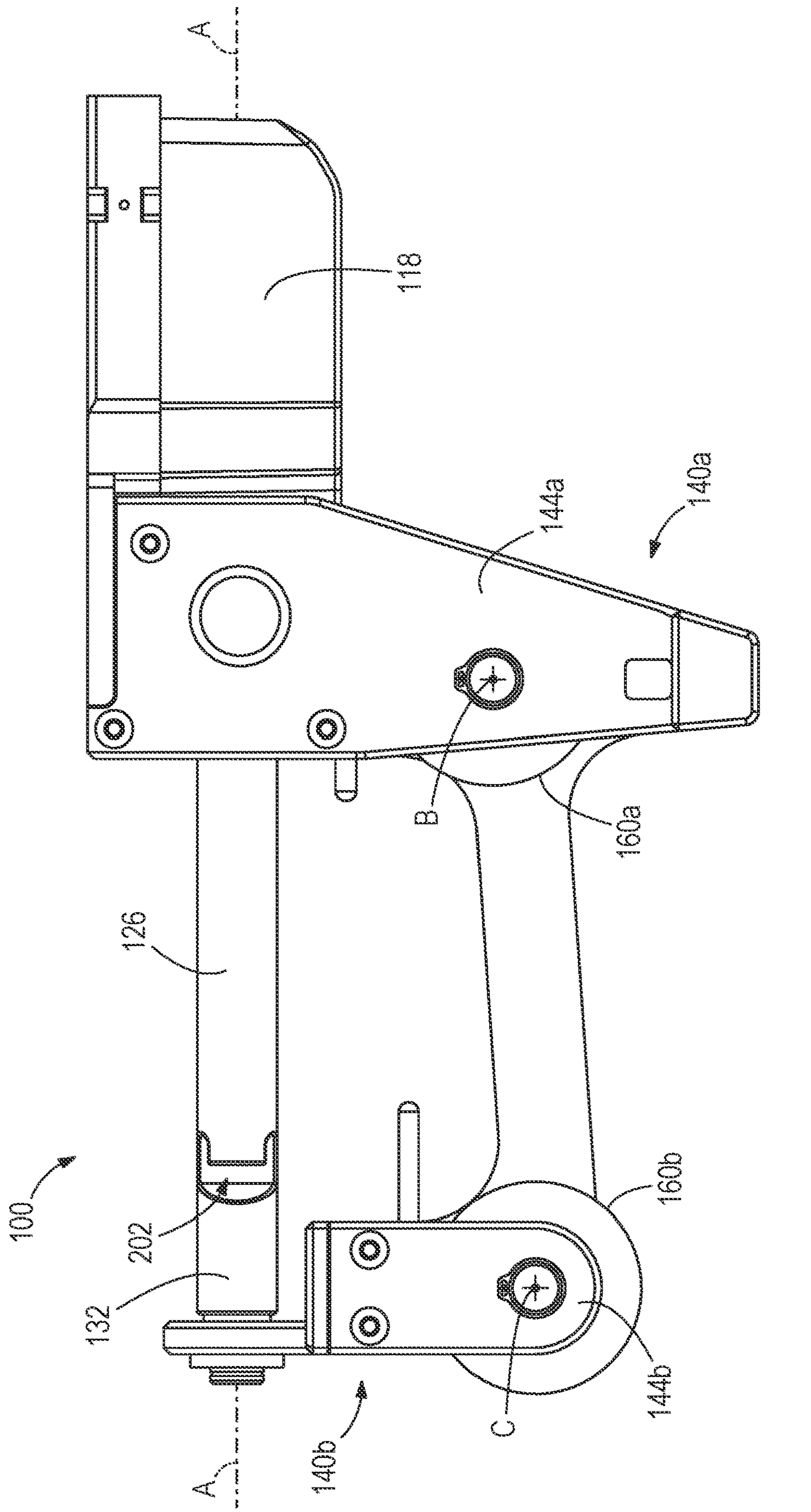
FIG. 4 is a side view of the stripping tool of FIG. 2.
Figure 5A:
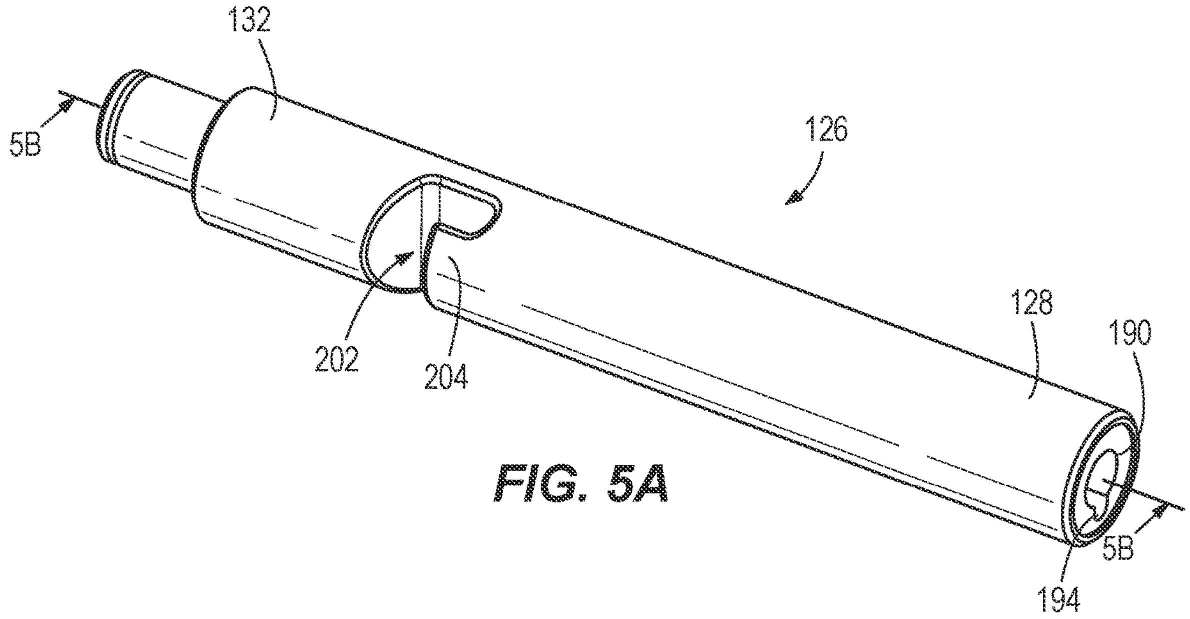
FIG. 5A is a perspective view of the mandrel of the stripping tool of FIG. 2.
Figure 5B:
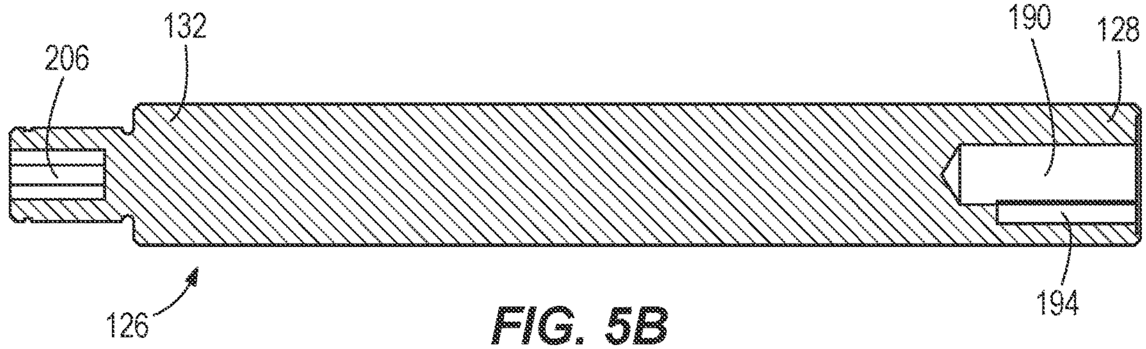
FIG. 5B is a cross-sectional view through the mandrel of the stripping tool taken along the line 5B-5B of FIG. 5A.
Figure 6:
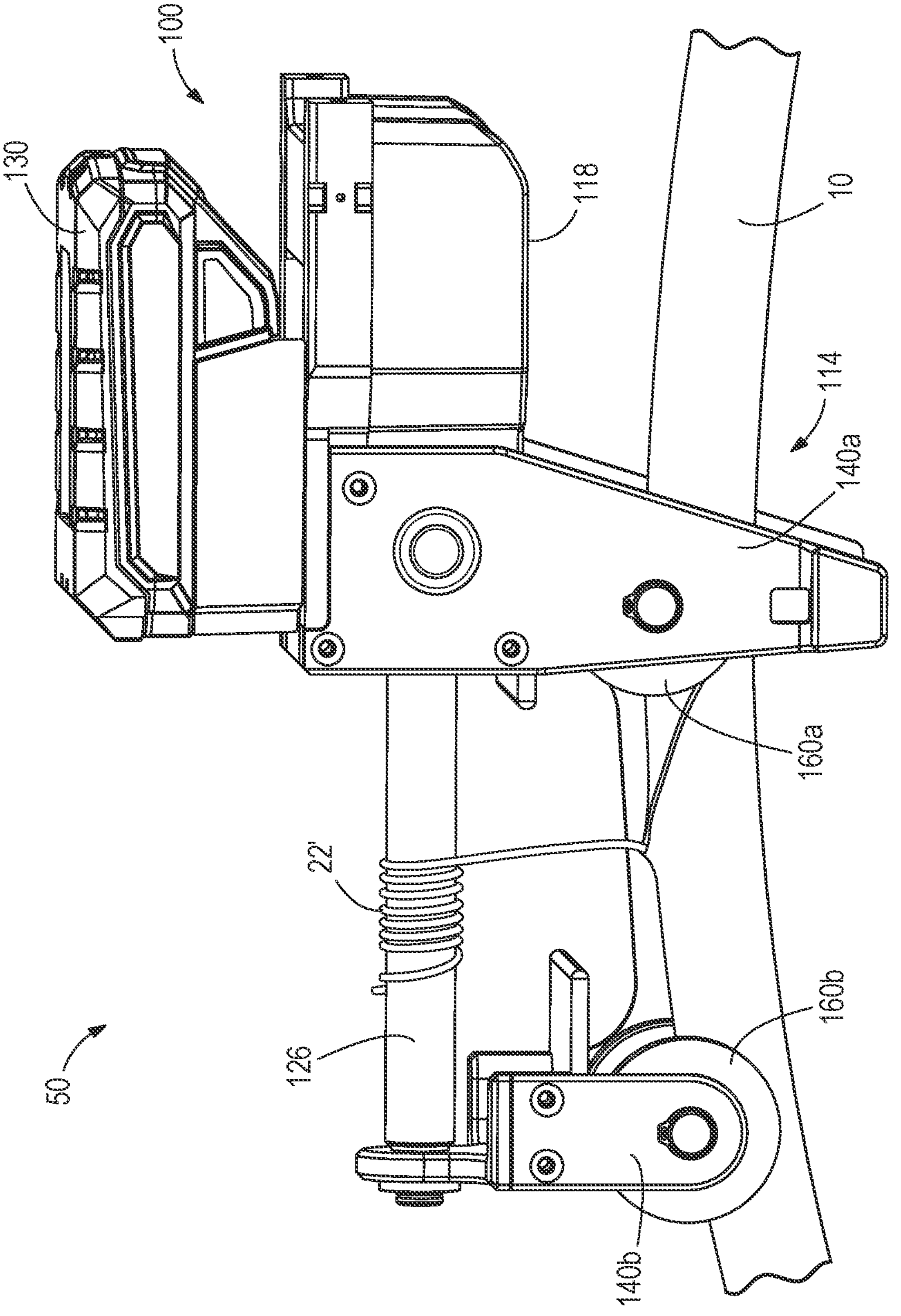
FIG. 6 is a side view of the stripping tool of FIG. 2 in operation.

FIGS. 2-6 illustrate the stripping tool 100 including a frame 114, a housing 118 supported by the frame 114, a motor 122 supported by and enclosed within the housing 118, and a shaft 126 (e.g., a mandrel) that is rotatably supported by the frame 114 and the housing 118. The illustrated stripping tool 100 is one example of a stripping tool. In other embodiments, the stripping tool 100 may include fewer or more components. The mandrel 126 defines a longitudinal axis A and extends between a first end 128 and a second end 132 opposite the first end. The first end 128 (FIG. 5A) is operably coupled to the motor 122 within the housing 118 and the second end 132 is supported by the frame 114. The mandrel 126 is rotatable about the longitudinal axis A by the motor 122. The motor 122 is powered by a power source 130 (FIG. 6). In the illustrated embodiment, the housing 118 includes a battery receptacle 134 configured to matingly receive the battery pack 130. A circuit board 180 (e.g., a PCB) is positioned within the housing 118 and is configured to be in electrical communication with the motor 122 and the attached battery pack 130. In some embodiments, the motor 122 may be actuatable via controls (e.g., buttons, switches, or actuators) on the housing 118 that are in communication with the PCB 180. In other embodiments, the motor 122 may additionally or alternatively be actuated via a remote control 188 (FIG. 32) including controls 184. The remote control 188 may be electronically coupled to the housing 118 by wires to communicate with the PCB, or the remote control 188 may communicate wirelessly with the PCB 180.

Figure 2:
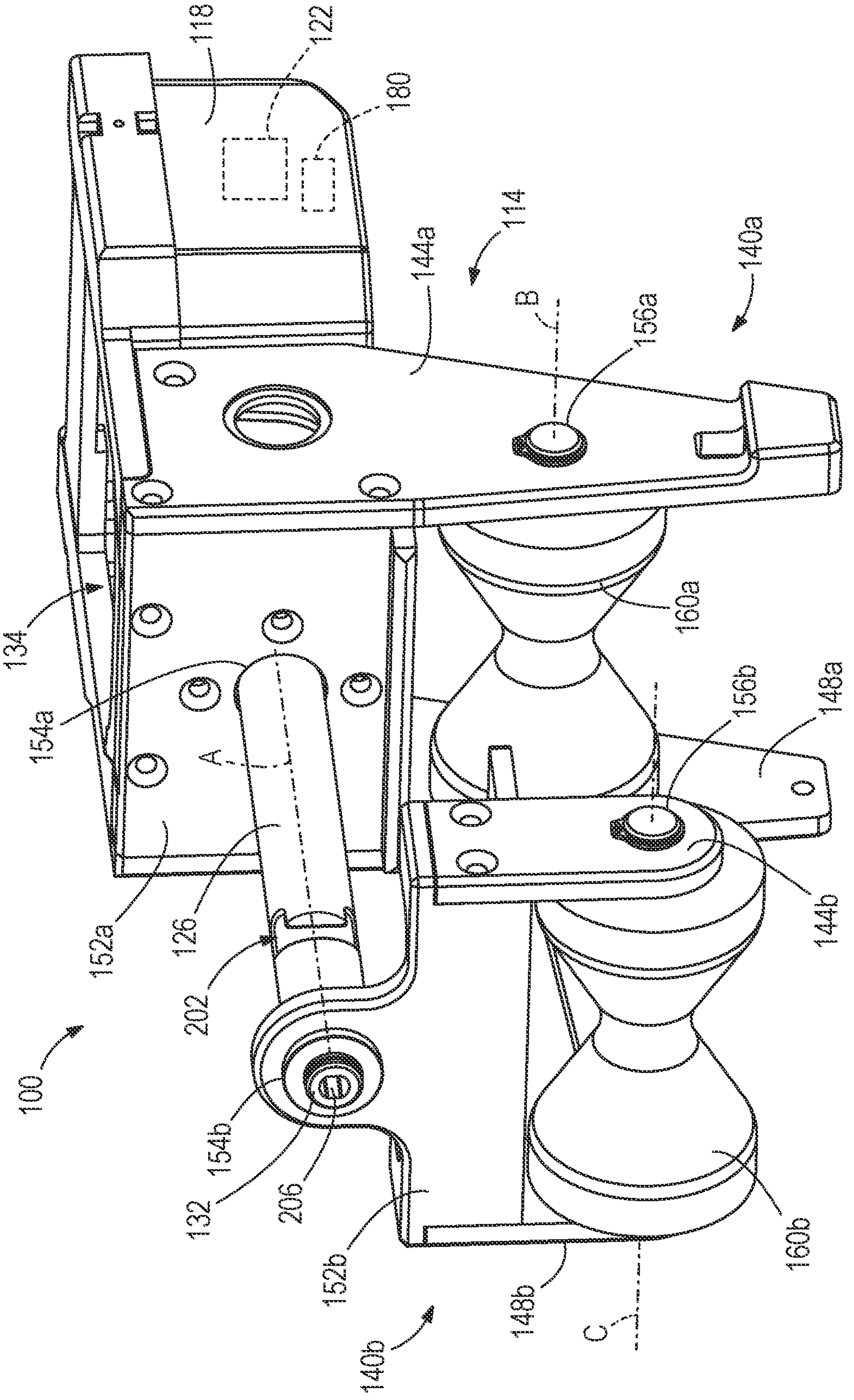
FIG. 2 is a perspective view of a stripping tool of a cable stripping system or tool, the stripping tool including a housing, a frame, and a mandrel.

With reference to FIG. 2, in the illustrated embodiment, the frame 114 includes a first frame portion 140*a* and a second frame portion 140*b* spaced apart from the first frame portion 140*a* in the direction of the longitudinal axis A. The second frame portion 140*b* defines a front of the stripping tool 100, while the housing 118 defines the rear of the stripping tool 100. The first frame portion 140*a* includes a bracket defining a U-shaped channel and supporting a first roller 160*a* for rotation about a first axis B. Specifically, the bracket includes a first support 144*a*, a second support 148*a* spaced apart from the first support 144*a*, and a third support 152*a* that extends at least partially in the direction of the first axis B between the first support 144*a* and the second support 148*a*. The third support 152*a* of the first frame portion 140*a* is mounted to the housing 118. In the illustrated embodiment, the third support 152*a* is secured to the housing using a plurality of fasteners. In other embodiments, the frame 114 may be coupled to the housing 118 in other ways. The third support 152*a* includes an aperture 154*a* extending therethrough that supports the mandrel 126 as it extends from an aperture (not shown) in the housing 118. The roller 160*a* is supported on a first shaft 156*a* that extends between and is supported by the first support 144*a* and the second support 148*a*. The first shaft 156*a* defines the first axis B and is rotatable relative to the first frame portion 140*a* about the first axis B. The first roller 160*a* is supported on the first shaft 156*a* and is rotatable therewith.

With continued reference to FIG. 2, the second frame portion 140*b* similarly includes a bracket defining a U-shaped channel and supporting a second roller 160*b* for rotation about a second axis C. Specifically, the bracket includes a first support 144*b*, a second support 148*b* spaced apart from the first support 144*b*, and a third support 152*b* that extends at least partially in the direction of the second axis C between the first support 144*b* and the second support 148*b*. The third support 152*b* of the second frame portion 140*b* includes an aperture 154*b* extending therethrough that supports the second end 132 of the mandrel 126. A second shaft 156*b* extends between and is supported by the first support 144*b* and the second support 148*b*. The second shaft 156*b* defines the second axis C and is rotatable relative to the second frame portion 140*b* about the second axis C. The second roller 160*b* is supported on the second shaft 156*b* and is rotatable therewith.

Figure 3:
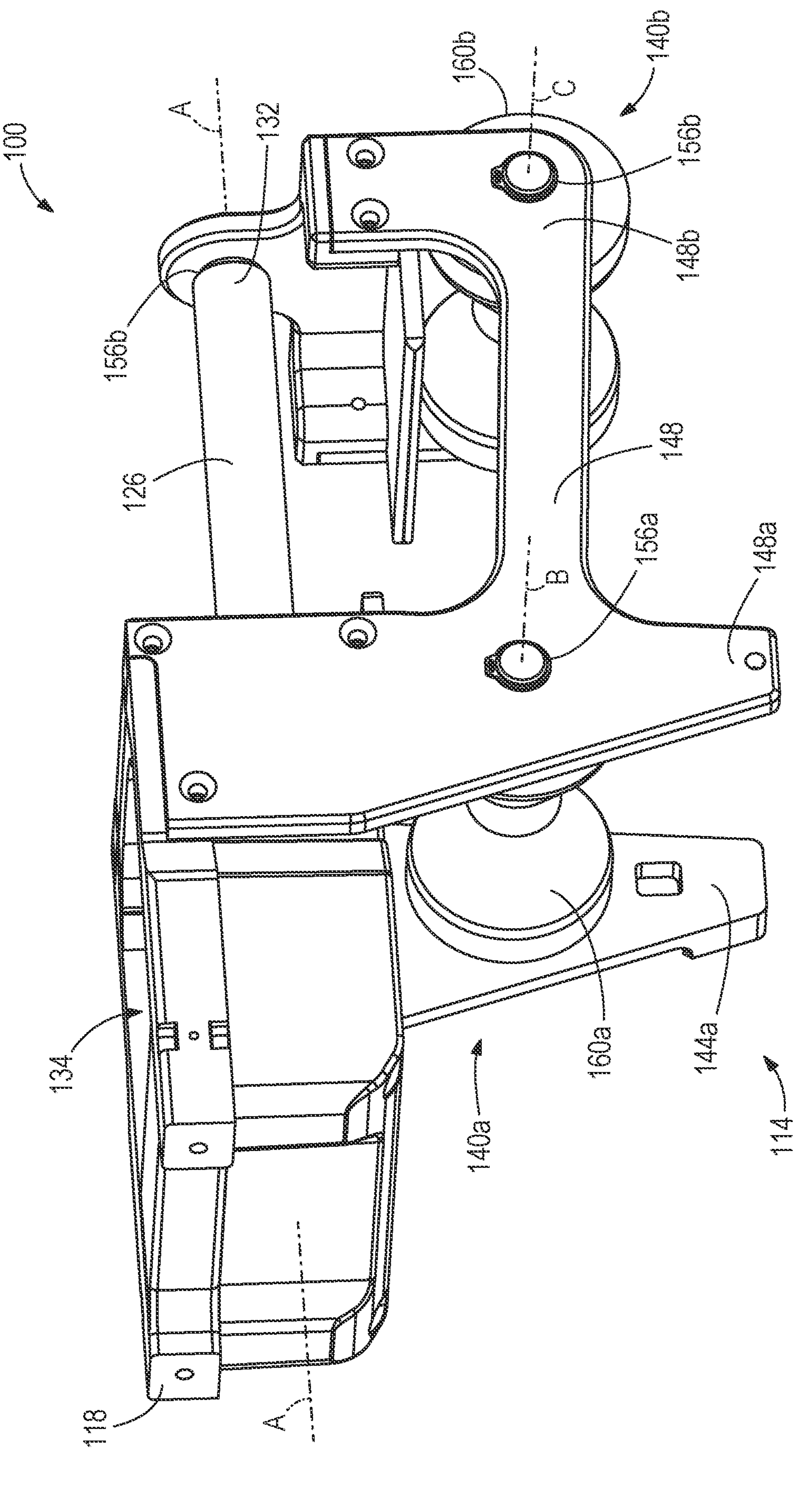
FIG. 3 is another perspective view of the stripping tool of FIG. 2.

With reference to FIG. 3, the first frame portion 140*a* and the second frame portion 140*b* are coupled together and spaced in the direction of the longitudinal axis A. Thus, the first axis B and the second axis C extend parallel to each other and are spaced from one another in the direction of the longitudinal axis A. In the illustrated embodiment, the second supports 148*a*, 148*b* are integrally formed as one piece 148 to maintain the relationship between the first frame portion 140*a* and the second frame portion 140*b*. In other embodiments, the second supports 148*a*, 148*b* may be separately formed and fixed together. In still other embodiments, the first frame portion 140*a* and the second frame portion 140*b* may be coupled together at other locations or using other means.

As seen in FIG. 4, the first frame portion 140*a* and the second frame portion 140*b* are supported with the apertures 154*a*, 154*b* of the third supports 152*a*, 152*b* aligned with one another along the longitudinal axis A. The mandrel 126 extends through the aligned apertures 154*a*, 154*b* of the housing 118, the first frame portion 140*a*, and the second frame portion 140*b*. The housing 118, the mandrel 126, and the battery pack 130 are spaced apart from the rollers 160*a*, 160*b*. In the illustrated embodiment, the housing 118, the mandrel 126 and the battery pack 130 are positioned above the rollers 160*a*, 160*b*. Accordingly, the longitudinal axis A of the mandrel 126 is upwardly offset relative to the first axis B and the second axis C. As shown, the longitudinal axis A is positioned above both the first axis B and the second axis C. Additionally, in the illustrated embodiment, first axis B and second axis C are also offset from each other. In other words, the first axis B is closer to the longitudinal axis A than the second axis C. In other embodiments, the first axis B and the second axis C may be arranged in the same plane parallel to and below the longitudinal axis A.

Returning to FIG. 2, the first roller 160*a* and the second roller 160*b* ride along the cable 10 when the stripping tool 100 is in use (see FIG. 6). In the illustrated embodiment, the first roller 160*a* and the second roller 160*b* are each shaped like an hourglass. In other words, a diameter of a first end of the rollers 160*a*, 160*b* (adjacent the respective first support 144*a*, 144*b*) and a diameter of a second end of the rollers 160*a*, 160*b* (adjacent the second support 148*a*, 148*b*) are both a first diameter which is larger than a second diameter of a central portion of the rollers 160*a*, 160*b* (between the first and second ends). The diameter of each of the rollers 160*a*, 160*b* narrows as it travels inward along the respective axis B, C from the first or second end toward the central location. As a result, when viewed from either the front or rear of the stripping tool 100, the rollers 160*a*, 160*b* each define a substantially V-shape between the first end and the second end that improves connection between the rollers 160*a*, 160*b* and the cable 10.

Turning to FIGS. 5A and 5B, the mandrel 126 extends between the first end 128 and the second end 132. In the illustrated embodiment, the mandrel 126 includes a first bore 190 extending into the first end along the longitudinal axis A. The first bore 190 is configured to matingly coupled to a drive shaft (not shown) of the motor 122. In the embodiment illustrated in FIGS. 5A and 5B, the first bore 190 may include a key slot 194, for example a notch in communication with the first bore 190. The key slot 194 receives or engages with a complementary key on the drive shaft of the motor 122 to rotatably couple the mandrel 126 to the motor 122. In other embodiments, the second end 132 of the mandrel 126 may couple to the motor 122 using different connection methods. The mandrel 126 also includes a second bore 206 extending into the second end 132 along the longitudinal axis A. The second bore 206 may be configured to receive one or more accessories or components of the cable stripping system 50. For example, the second bore 206 may couple to one of the starter tool 104, the termination tool 108, or the braid tool 112. Such accessories will be discussed in greater detail below. The second end 132 of the mandrel 126 may be threaded adjacent the second bore 206 to facilitate coupling between the accessories and the mandrel 126. In other embodiments, other connection methods may be used to couple the accessories to the mandrel 126.

With continued reference to FIG. 5A, the mandrel 126 includes a slot 202 positioned adjacent the second end 132. The slot 202 removably receives the starter wire 22' (FIG. 6) of the cable 10. In the illustrated embodiment, the slot 202 is generally U-shaped or hook shaped and forms a projection 204 adjacent the slot 202.

Turning to FIG. 6, the stripping tool 100 is shown in use. The stripping tool 100 is coupled to ride along the cable 10. Specifically, the V-shaped profiles of the first and second rollers **160*a*, 160*b* are positioned against a surface of the cable 10, so that the housing 118, mandrel 126, and battery pack 130 are spaced apart from the surface of the cable 10. In some embodiments, a latch is coupled between the first support 144*a* and the second support 148*b* below the cable to inhibit the stripping tool 100 from uncoupling from the cable 10. Once the starter wire 22' has been extracted from the outer end of the cable 10, for example by the starter tool 104, the starter wire 22' is received in the slot 202 of the mandrel 126 and wrapped around the projection 204 to couple the starter wire 22' to the mandrel 126. The motor 122 is actuated to rotate the mandrel 126 about the longitudinal axis A, which winds the starter wire 22' around an outer surface of the mandrel 126. As the wire 22' winds onto the mandrel 126, the stripping tool 100 is supported on the cable 10, and the rollers 160*a*, 160*b* ride along the cable 10 advancing the stripping tool 100 along the cable 10. The rotation of the mandrel 126 pulls the starter wire 22', ripping the cable jacket 26 in a spiral shape (mimicking the spiral positioning of the starter wire 22' under the cable jacket 26). The force applied to the starter wire 22' by the rotation of the mandrel pulls the stripping tool along the cable 10. Once the starter wire 22' is pulled out and has torn the cable jacket 26 up to the score mark at the second end created by the termination tool 108, the user will stop the stripping tool 100 and unwind the starter wire 22' from the mandrel 126. In some embodiments, the starter wire 22' is unwound from the mandrel 126 by operating the motor 122 in reverse and allowing the stripping tool 100 to retreat along the cable 10. The cable jacket 26 can then be removed by hand, exposing the plurality of neutral wires 22 to be twisted or braided together so the neutral wires 22** can be grounded.

FIGS. 7-23 illustrate various embodiments of starter tools 104 of the cable stripping system 50 (tools or accessories for use in starting the stripping process). FIGS. 7-17 illustrate accessories that are coupled to the mandrel 126 of the stripping tool 100, while FIGS. 18-23 illustrate tools or accessories that are separate from, but useable with, the stripping tool 100.

Figure 7:
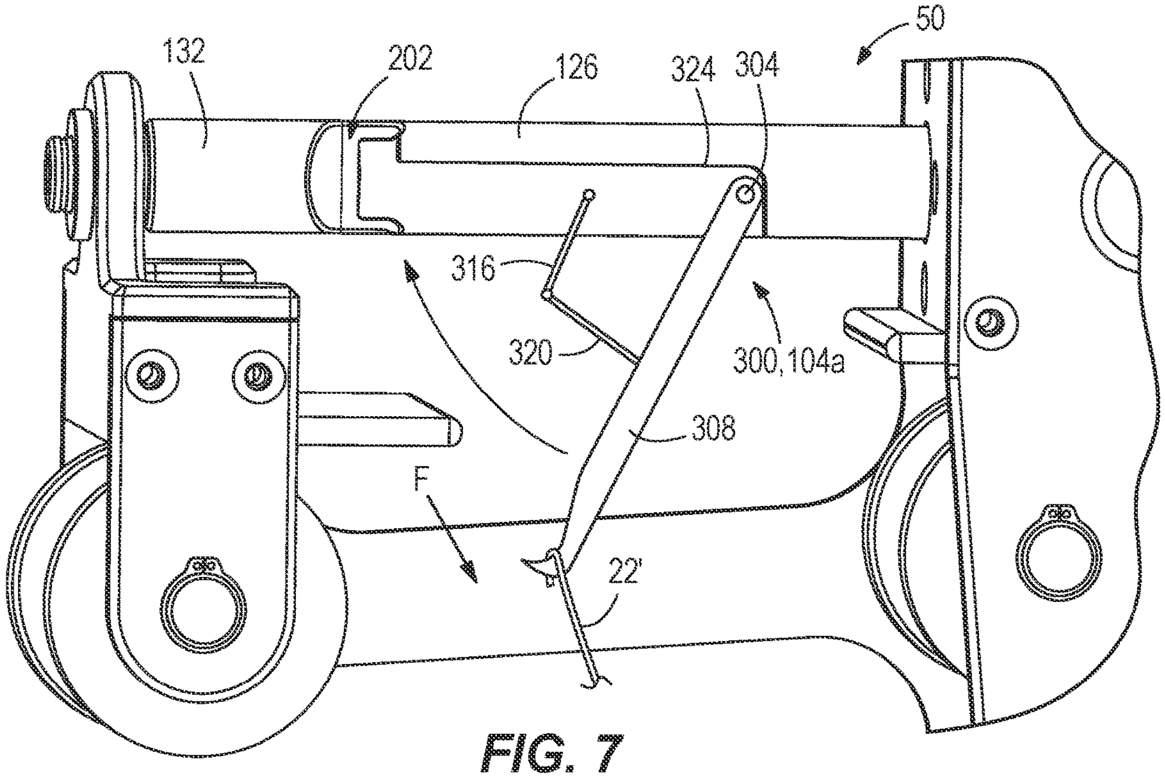
FIG. 7 is a side view of a starter tool of the cable stripping system according to a first embodiment, illustrated in a first position relative to the mandrel of the stripping tool of FIG. 2.
Figure 8:
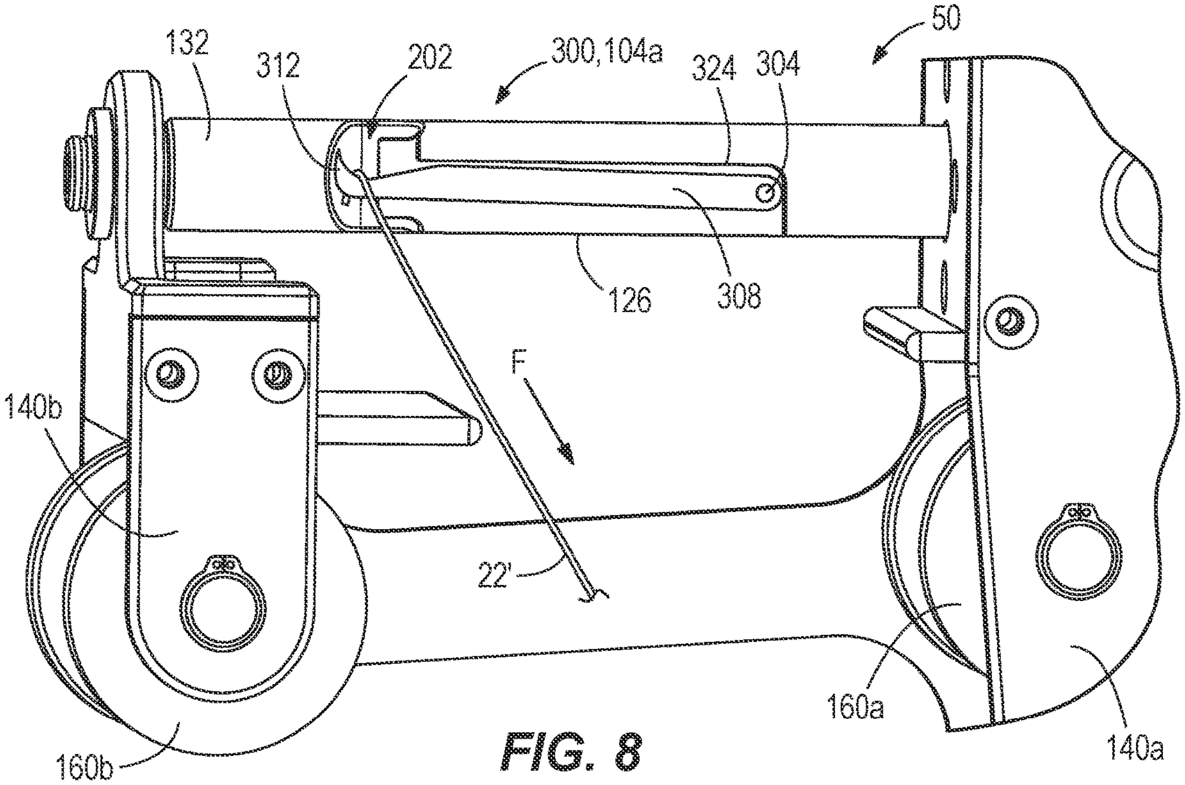
FIG. 8 is a side view of the starter tool of FIG. 7 is a second position relative to the mandrel.

FIGS. 7-8 illustrate a first embodiment of a starter tool **104*a* used to start the stripping process. In the embodiment of FIGS. 7-8, the starter tool 104*a* is integrated with the mandrel 126 of the stripping tool 100. A linkage 300 is coupled to the mandrel 126 for movement between a first or extended position (FIG. 7) and a second or stowed position (FIG. 8). In the illustrated embodiment, the linkage 300 includes a first link 308 that is pivotably coupled to the mandrel 126 for rotation about a pivot point 304. The first link 308 includes a hook 312 formed in the end opposite the pivot point 304. The first link 308 is supported by a first support linkage 316 and a second support linkage 320**.

As seen in FIG. 7, in the extended position, the linkage 300 extends away from the mandrel 126 and the hook 312 is spaced from the mandrel 126 and can be used to extract the starter wire 22' from the outer end of the cable 10. In the illustrated embodiment, the linkage 300 is positionable at a generally acute angle relative to the mandrel 126, but in other embodiments, the linkage 300 may be positionable at a generally perpendicular angle or a generally obtuse angle. The first support linkage 316 may extend from mandrel 126 and couple to the second support linkage 320 that extends from a surface of the first link 308. The first support linkage 316 and the second support linkage 320 support the first link 308 in the extended position. In some embodiments, the user moves the linkage 300 to the extended position by manually applying a force to the first link 308 in the direction of arrow F. In other embodiments, the linkage 300 may include an actuator (e.g., a motor, solenoid, etc.) (not shown) operated by controls on the housing 118 or the remote control 188 (FIG. 32) that moves the linkage 300 to the extended position.

Turning to FIG. 8, in the stowed position, the linkage 300 is recessed into the mandrel 126. Specifically, the linkage 300 is received in an elongated slot 324 that extends parallel to the longitudinal axis A. The elongated slot 324 is recessed into an outer surface of the mandrel 126 and is separate from the U-shaped wire slot 202. The linkage 300 is pivotably coupled to the mandrel 126 by the pivot point 304 within the elongated slot 324 and is selectively receivable or positionable within the elongated slot 324 such that in the stowed position, the linkage 300 does not extend radially outward past the outer surface of the mandrel 126. In some embodiments, the linkage 300 may be flush with the outer surface of the mandrel 126 and cooperate with the mandrel 126 to form a continuous outer surface for the starter wire 22' to wind around. In the illustrated embodiment, the elongated slot 324 is adjacent the wire slot 202 and in communication with the wire slot 202 so that in the stowed position the hook 312 of the first link 308 is positioned within the wire slot 202.

When the user needs to start the cable stripping process, the user can move the linkage 300 from the stowed position to the extended position (manually or via controls). When in the extended position, the user can use the hook 312 to dig one of the neutral wires 22 (i.e., the starter wire 22') out of the first end of the cable 10. The user can then secure the end of the starter wire 22' around the hook 312. Once the starter wire 22' is appropriately secured to the hook 312, the linkage 300 can be moved from the extended position back to the stowed position. In this way the hook 312, and therefore the end of the starter wire 22', may be appropriately positioned within the wire slot 202 of the mandrel 126. In some embodiments, the user may manually move the linkage 300 from the extended position to the stowed position by exerting a force on the linkage 300 in a direction opposite the arrow F or this could be done by actuating a button (e.g., actuator) on the housing 118 or the remote control 188. In some embodiments, the linkage 300 can be moved back to the stowed position automatically. For example, in some embodiments the linkage 300 may include a biasing member (e.g., a torsion spring, etc.) that exerts a return force on the first link 308 in a direction opposite the arrow F. In other embodiments, operation of the stripping tool 100 may automatically move the linkage 300 to the stowed position. In such case, when the starter wire 22' is attached to the hook 312, the tool 100 can be started with the linkage 300 still in the extended position. The mandrel 126 will begin to rotate about the longitudinal axis A, and when the mandrel 126 has rotated a sufficient amount (in the illustrated embodiment, between 90 degrees and 180 degrees) with the linkage extending generally upwards, then the force of the starter wire 22' on the hook 312 in the direction of the arrow F will cause the linkage 300 to move from the extended position to the stowed position automatically. The use of linkage 300 and the hook 312 reduces the amount the starter wire 22' that needs to be pulled out of the cable jacket 26 to couple the starter wire 22' to the mandrel 126. In some embodiments, the linkage 300 may replace the slot 202, such that the starter wire 22' is coupled to the mandrel 126 by the hook 312 of the linkage 300. The starter tool 104*a* is advantageously built into the mandrel 126 of the stripping tool 100 to decrease the likelihood of misplaced parts during storage or transport and to improve the efficiency of the starting and stripping operation.

Figure 9:
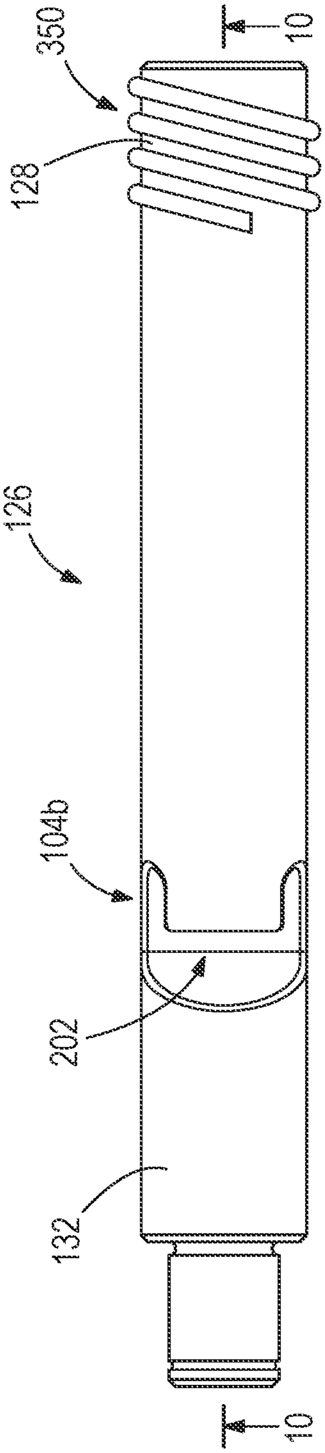
FIG. 9 is a side view of a starter tool of the cable stripping system according to a second embodiment illustrated on a removable mandrel for use with the stripping tool of FIG. 2.
Figure 10:
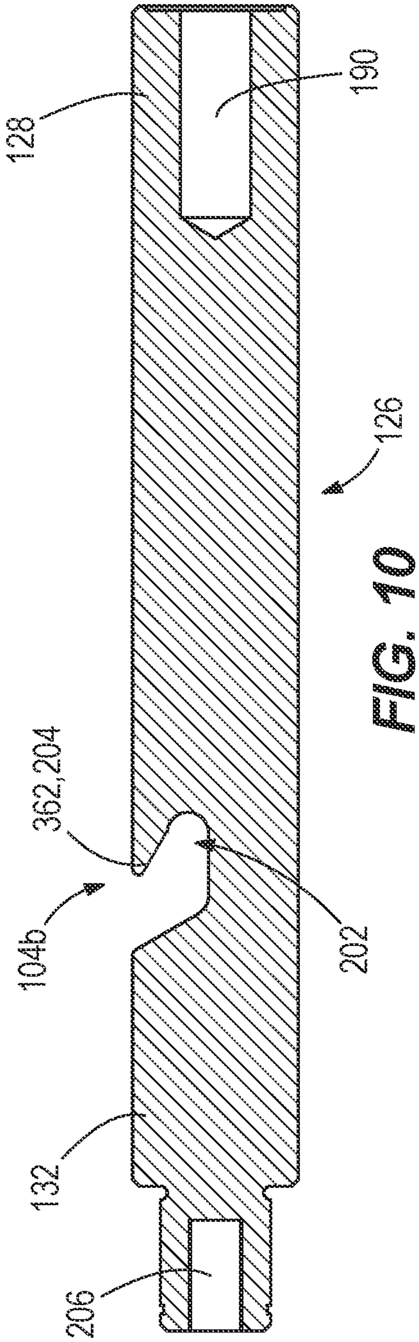
FIG. 10 is a cross-sectional view of the starter tool of FIG. 9 taken along the line 10-10 of FIG. 9.
Figure 11:
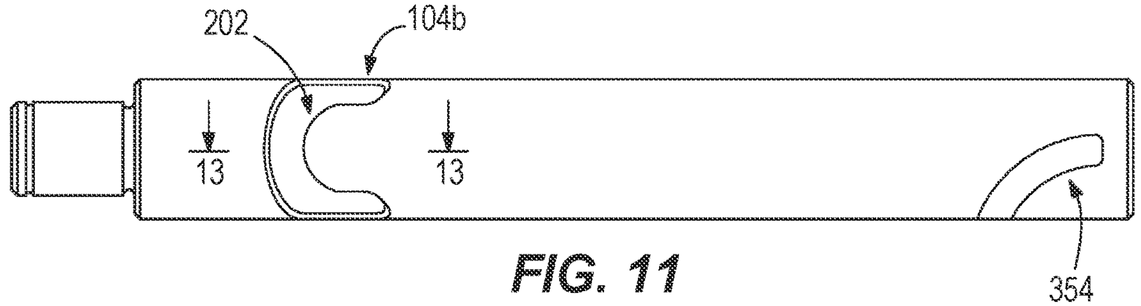
FIG. 11 is a side view of the second embodiment of the starter tool of the cable stripping system illustrated on another removable mandrel for use with the stripping tool of FIG. 2.
Figure 12:
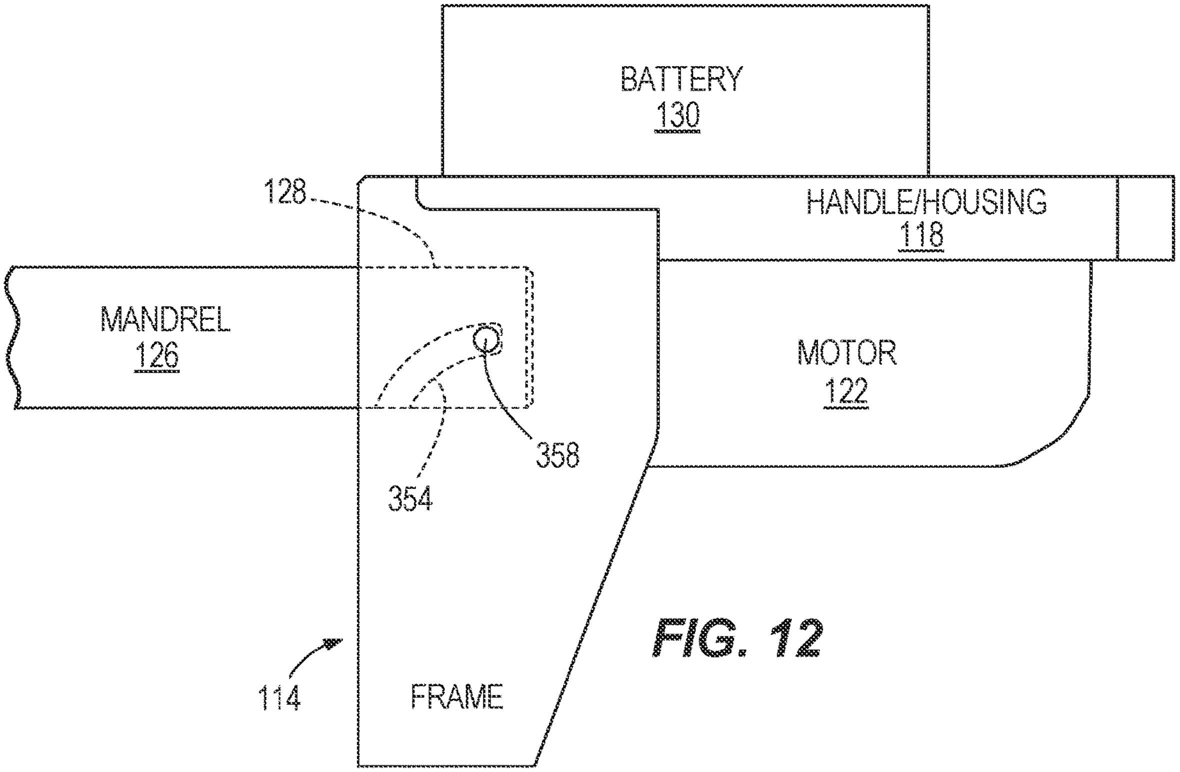
FIG. 12 is a schematic view of the removable mandrel of FIG. 11 coupled to the stripping tool of FIG. 2.

FIGS. 9-13 illustrate a second embodiment of a starter tool 104*b* illustrated with two embodiments of the mandrel 126 of the stripping tool 100. Specifically, the starter tool 104*b* is integrated into the mandrel 126 and the mandrel 126 is removable from the motor 122, the housing 118, and the frame 114. FIGS. 9-10 illustrate a first embodiment of a removable mandrel 126, and FIGS. 11-12 illustrate a second embodiment of a removable mandrel 126.

In the embodiment shown in FIGS. 9 and 10 the mandrel 126 is removably coupled to the motor 122 by threads. The first end 128 of the mandrel 126 has a threaded surface 350 that is configured to engage a complementary threaded surface (not shown) on the motor 122 (e.g., on the drive shaft). The threaded surface 350 may be oriented such that the mandrel 126 is threadably coupled to the motor 122 in a direction opposite to the direction of rotation of the drive shaft and mandrel 126 during use. In some embodiments, the connection of the threaded surface 350 transmits all of the rotation between the motor 122 and the mandrel 126. In other embodiments, the mandrel 126 may include additional features (such as the key slot 194 shown in FIGS. 5A-5B) that assist in transmitting the rotation between the motor 122 and the mandrel 126.

Figure 13:
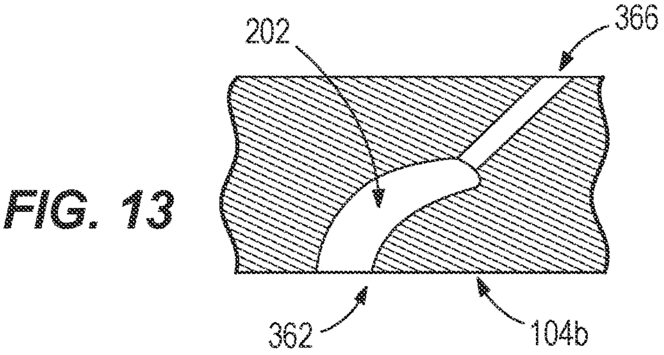
FIG. 13 is a cross-sectional view of the second embodiment of the starter tool taken along the line 13-13 of FIG. 11.
Figure 14:
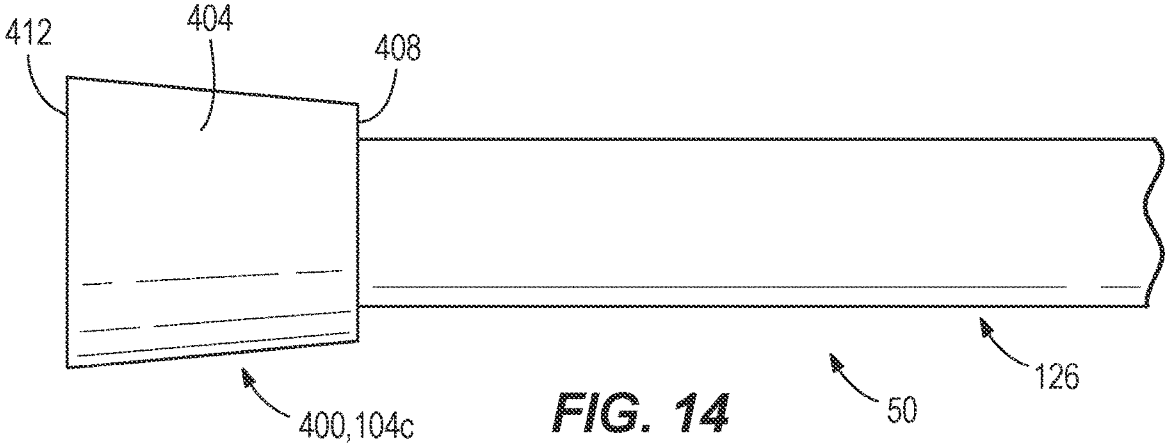
FIG. 14 is a side view of a starter tool of the cable stripping system according to a third embodiment coupled to an end of the mandrel of the stripping tool of FIG. 2.
Figure 16:
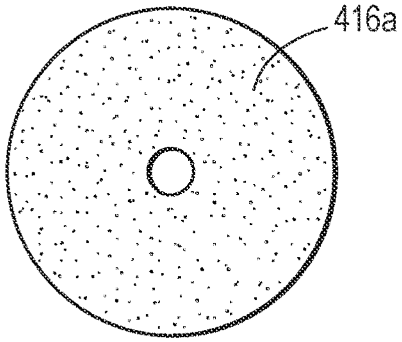
FIG. 16 illustrates a material of a first type for use on an inner surface of the starter tool of FIG. 14.
Figure 15:
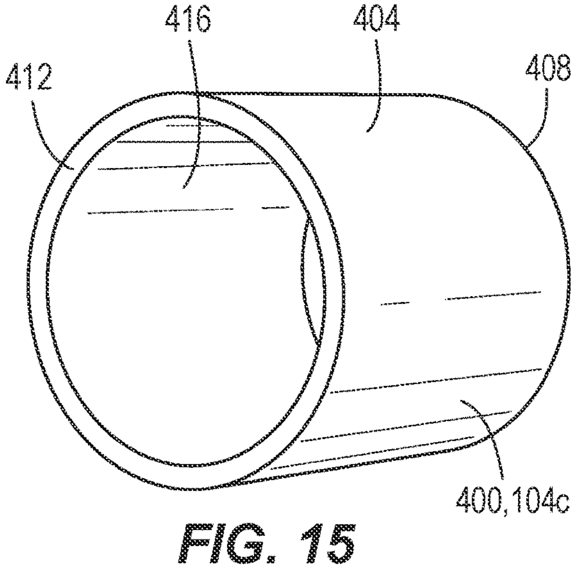
FIG. 15 is an end view of the starter tool of FIG. 14.

In the embodiment of FIGS. 11-13, the mandrel 126 is removably coupled to the motor 122 using a keyed connection. The first end 128 of the mandrel 126 has a key slot 354 in a side thereof. The key slot 354 is configured to receive a pin 358 (FIG. 12) extending from the motor 122 to couple the mandrel 126 to the motor 122. The key slot 354 may be shaped so that rotation of the motor 122 does not move the pin 358 within the key slot 354 and the connection between the mandrel 126 and the motor 122 is not at risk of disengaging.

In either embodiment, the starter tool 104*b* is formed in the removable mandrel 126 so a user can remove the mandrel 126 from the housing and operate the starter tool 104*b* with improved maneuverability. The starter tool 104*b* includes a sharp edge or blade 362 on the projection 204 formed by the wire slot 202 of the mandrel 126. Also, in some embodiments, as shown in FIG. 13, the wire slot 202 may extend through the whole mandrel 126 to an opening 366 on an opposite side of the mandrel 126 with respect to the wire slot 202.

When the user wants to begin a cable stripping process, the user can remove (e.g., unthread or release) the mandrel 126 from the frame 114, the housing 118, and the motor 122. The user can then use the blade 362 on the mandrel 126 to dig out the starter wire 22' and couple the starter wire 22' to the mandrel 126. In embodiments with the opening 366 in the slot 202, the starter wire 22' may be received all the way through the mandrel 126 and extend out through the opening 366. Once the starter wire 22' has been coupled to the mandrel 126, the user can recouple (e.g., rethread or re-engage) the first end 128 of the mandrel 126 to the motor 122, the housing 118, and the frame 114. At this point, the cable stripping process may begin.

Figure 17:
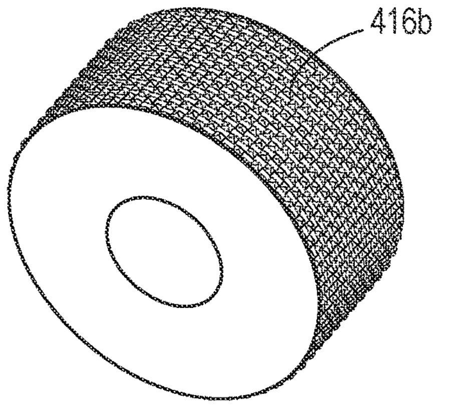
FIG. 17 illustrates a material of a second type for use on an inner surface of the starter tool of FIG. 14.

FIGS. 14-17 illustrate a third embodiment of a starter tool 104*c*. In the embodiment of FIGS. 14-17, the starter tool 104*c* includes a collar 400 coupled to the second end 132 of the mandrel 126 and rotatable with the mandrel 126, via the motor 122. The collar 400 may be coupled by any suitable means, including but not limited to threads, fasteners, adhesives, snap-fit engagement, friction-fit engagement, etc. The collar 400 includes a body 404 that has a generally circular cross-section and that is generally hollow. The collar 400 has a first end 408 that is coupled to the mandrel 126 and a second end 412 that is spaced apart from the first end 408. The first end 408 has a diameter that is smaller than a diameter of the second end 412. The diameter of the collar 400 tapers outward from the first end 408 to the second end 412. An inner surface 416 of the collar 400 includes an abrasive texture. The abrasive texture may be created by any suitable material, such as, but not limited to, sandpaper 416*a* (FIG. 16) or knurled metal 416*b* (FIG. 17). In some embodiments, the collar 400 may be permanently coupled to the mandrel 126 or the collar 400 may be removably coupled to the mandrel 126 (e.g., to replace a worn out collar 400, to exchange the collar 400 for a different sized collar 400, or to be able to couple another accessory or tool to the end of the mandrel 126).

When the user wants to use the starter tool 104*c* to start the cable stripping process, the user couples the collar 400 to the second end 132 of the mandrel 126, if not already there. Then, the collar 400 is positioned around the outer end of the cable 10. The user instructs the PCB 180 (e.g., via a button on the housing 118 or a button on the remote control 188) to actuate the motor 122 to rotate the mandrel 126, and therefore the collar 400. As the collar 400 rotates relative to the cable 10, the abrasive texture on the inner surface 416 will wear against the cable jacket 26, thereby removing the cable jacket 26 to expose the concentric neutral wires 22. The tapered diameter of the collar 400 enables the collar 400 to be used with a range of cables 10 having different diameters.

Figure 18:
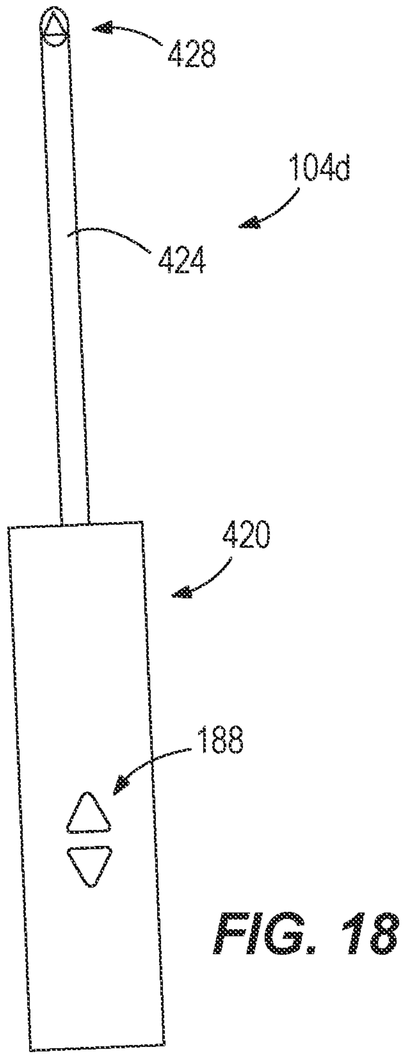
FIG. 18 illustrates a starter tool of the cable stripping system according to a fourth embodiment including an aperture with sharp edges positioned on a working end.
Figure 19:
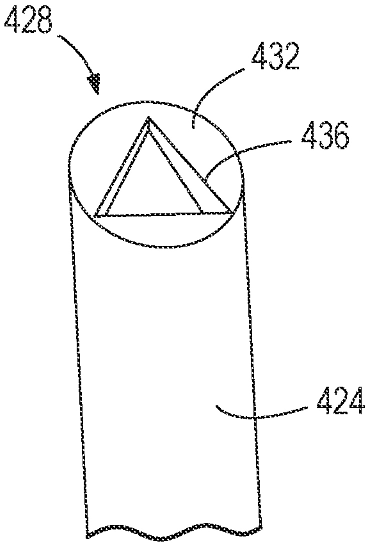
FIG. 19 is a detailed view of the working end and the aperture of the starter tool of FIG. 18.
Figure 20:
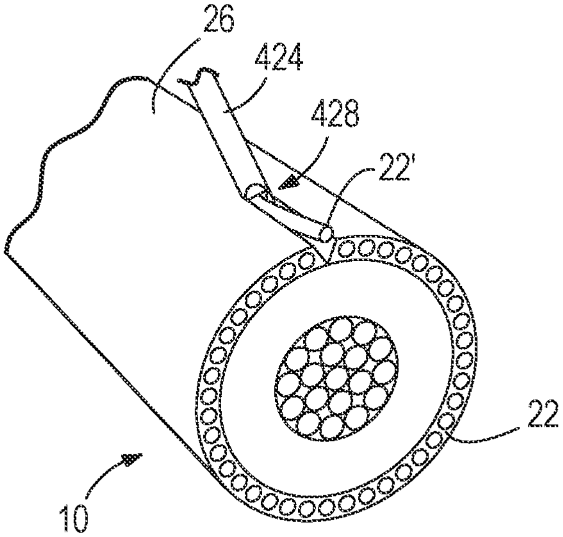
FIG. 20 illustrates a schematic view of the starter tool of FIG. 18 in use with a first or outer end of an exemplary cable.

FIGS. 18-20 illustrate a fourth embodiment of a starter tool 104*d* including a handle 420 and a shaft 424 extending from the handle 420. In some embodiments, the handle 420 may be the remote control 188 such that the shaft 424 extends from the remote control 188. In other embodiments, the starter tool 104*d* may be a separate, dedicated tool. In such embodiments, the starter tool 104*d* may be coupled to the stripping tool 100 or the remote control 188 by a lanyard, cable, carabiner, or the like, or may be removably received in a storage slot in the stripping tool 100 or the remote control 188. The shaft 424 is generally cylindrical and has a working end 428 that is opposite the handle 420. The working end 428 includes an angled surface 432 and an aperture 436 extending through the working end 428 and the angled surface 432. The aperture 436 is generally triangular, and the sides thereof may include sharp or bladed edges. When the user wants to begin the cable stripping process using the starter tool 104*d*, the user grips the handle 420 to position the angled surface 432 of the working end 428 against an edge of the first end of the cable 10 with the apex of the triangle pointed at a center of the cable 10. A force on the working end 428 of the starter tool in a direction towards the end of the cable 10 causes the sharp edges of the aperture 436 to dig into the cable jacket 26 around a starter wire 22' to dig the starter wire 22' from the cable 10.

In some embodiments, the starter tool 104*d* may be integrated into the mandrel 126 of the stripping tool 100. For example, the second end 132 of the mandrel 126 be substantially the same as the working end 428 of the shaft 424 and, like the mandrel 126 of FIGS. 9-13, the mandrel 126 may be removably coupled to the motor 122, the frame 114, and the housing 118. Accordingly, the mandrel 126 may be removed (as discussed above with respect to FIGS. 9-13) to use the working end thereof to dig out a starter wire 22' (as discussed above with respect to FIGS. 18-20) and then may be replaced on the stripping tool 100 (discussed above with respect to FIGS. 9-13).

Figure 21:
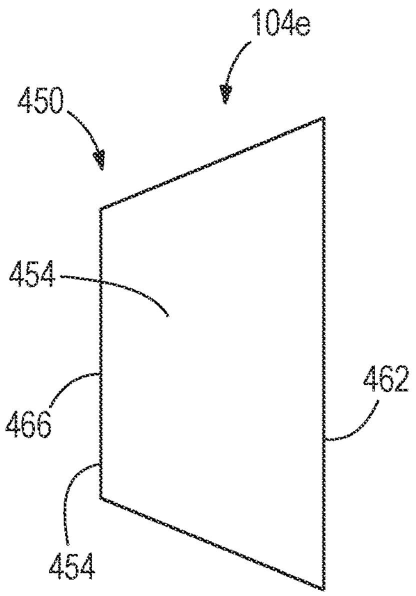
FIG. 21 is a schematic side view of a starter tool according to a fifth embodiment.
Figure 22:
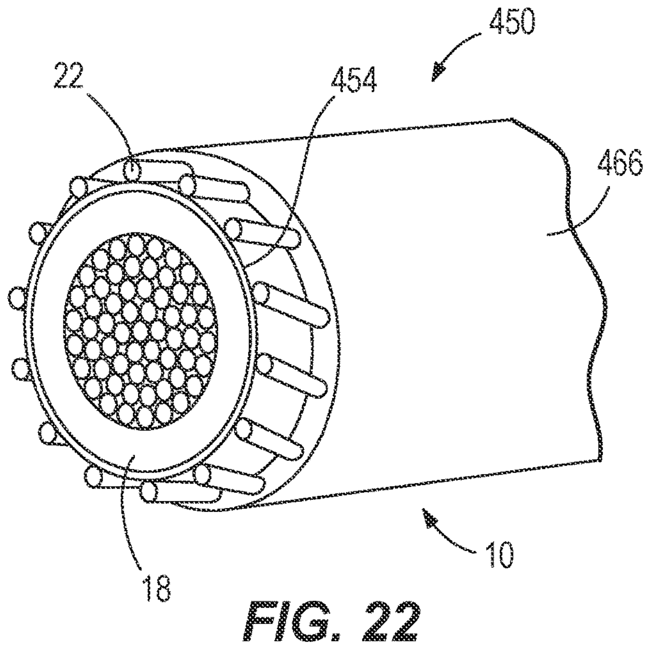
FIG. 22 is a schematic perspective view of the starter tool of FIG. 21 in use with a first end of an exemplary cable.
Figure 23:
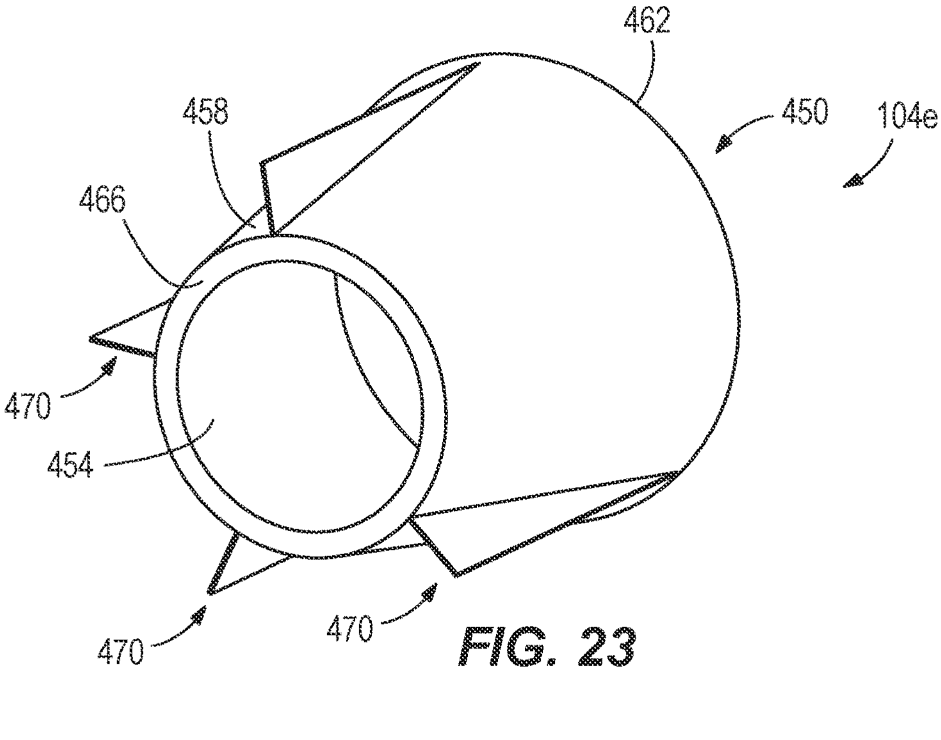
FIG. 23 is a perspective view of the starter tool of FIG. 21, further including radially extending blades.

FIGS. 21-23 illustrate a fifth embodiment of a starter tool 104*e* including a collar 450. The starter tool 104*e* may be removably coupled to the housing 118 of the stripping tool 100 for easy transport and access. In other embodiments, the starter tool 104*e* may be carried in a case associated with the cable stripping system 50 alongside the stripping tool 100. The collar 450 includes a body 454 that has a generally circular cross-section and that is generally hollow. The collar 450 has a first end 458 and a second end 462 that is spaced apart from the first end 458. The first end 458 has a diameter that is smaller than a diameter of the second end 462. The diameter of the collar 450 tapers outward from the first end 458 to the second end 462. The first end 458 includes a sharp or bladed edge 466. As seen in FIG. 23, the collar 450 may additionally include a plurality of blades 470 extending (e.g., outwardly, or radially outwardly) from an outer surface of the collar 450. The blades 470 are positioned at the first end 458. In the illustrated embodiment, the blades 470 may be equidistantly spaced relative to one another about the collar 450. When the user wants to begin the cable stripping process using the starter tool 104*e*, the user positions the first end 458 of the collar 450 against the first end of the cable 10 such that the bladed edge 466 is positioned between a center of the cable 10 and the concentric neutral wires 22 of the cable 10 (e.g., between the insulation material(s) 18 and the concentric neutral wires 22). Then, the user exerts a force on the second end 462 of the collar 450 to advance the first end 458 beneath the concentric neutral wires 22, thereby displaying them from the insulation material(s) 18 to be more easily accessed. In embodiments with the blades 470, the blades 470 may extend radially outward between the concentric neutral wires 22 and cut the cable jacket 26 into strips which can be peeled back to select and grip a starter wire 22'. In some embodiments, the starter tool 104*e* includes a set of collars 450 each having a first end 458 with a different diameter to accommodate varied sizes of cable. Therefore, the user can choose the appropriate collar 450 for the respective cable(s) 10 of the project. In some embodiments, the second end 462 of each of the collar(s) 450 of FIGS. 21-23 may be coupled to or removably coupled to the second end 132 of the mandrel 126 such that the rotation of the mandrel 126 (via the motor 122) could be used to advance the first end 458 into the cable to displace to the neutral wires 22 from the insulation material(s) 18.

Figure 24:
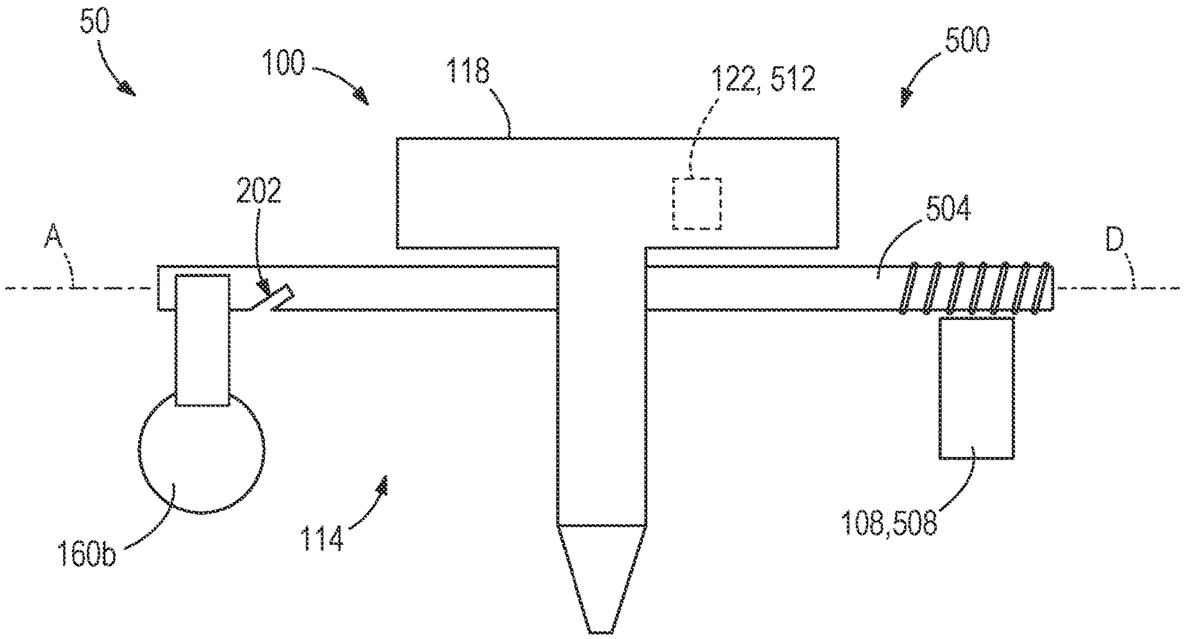
FIG. 24 is a schematic view of the cable stripping system including the stripping tool of FIG. 2 and a termination tool, the termination tool coupled to the housing by a termination assembly according to a first embodiment having a drive shaft coupled to a motor in the housing of the stripping tool.
Figure 25:
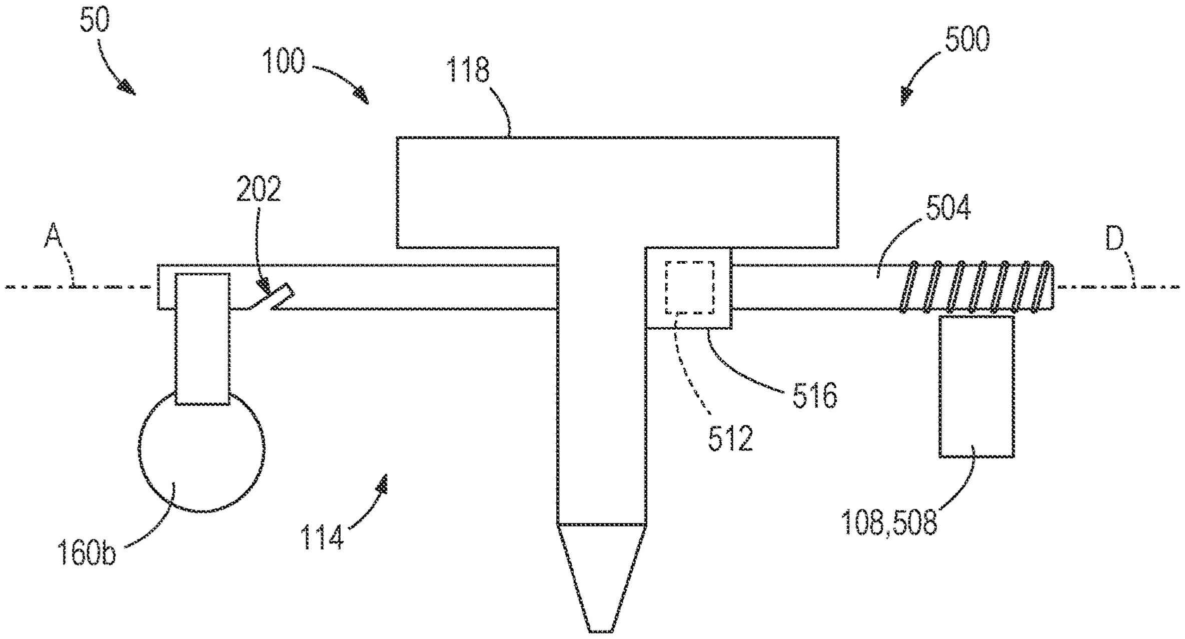
FIG. 25 is a schematic view of the cable stripping system including the stripping tool of FIG. 2 and a termination tool, the termination tool coupled to the housing by a termination assembly according to a second embodiment having a housing, a motor in the housing, and a drive shaft coupled to the motor.

FIGS. 24-25 illustrate the cable stripping system including a termination tool 108 coupled to the stripping tool 100 by embodiments of a termination assembly 500. Both embodiments of the termination assembly 500 illustrate a motor-actuator assembly including a drive shaft 504 having a first end and a second end spaced apart from the first end. In the illustrated embodiments, the first end is operably coupled to a motor and the second end is operably coupled to a termination tool 108. In the embodiment of FIG. 24 the first end of the drive shaft 504 is coupled to a motor in the housing 118. In some embodiments, this is the motor 122 that drives the mandrel 126. In some embodiments, this is a second motor 512 positioned within the housing 118. In embodiments utilizing the motor 122, the user may actuate a button on the housing 118 or the remote control 188 to cause the motor 122 to switch from being operably engaged with the mandrel 126 to being operably engaged with the drive shaft 504 of the termination assembly 500. In the embodiment of FIG. 25, the stripping tool 100 may include a separate housing 516 containing the second motor 512 for operably engaging the drive shaft 504 of the termination assembly 500. The second housing 516 may be coupled to the housing 118. In the embodiments of FIGS. 24 and 25, the user may position the termination tool 108 at the inner end of the portion of cable 10 being stripped, or at a desired location along the length of the cable 10 and the user may actuate the motor 122, 512 to rotate the drive shaft 504 to cause the termination tool 108 to create the score mark in the cable jacket 26. Once the score mark has been made, the user can then begin the stripping process, as discussed above.

In the illustrated embodiments, the drive shaft 504 of the termination assembly 500 defines an axis D that is generally parallel to and coincident with the longitudinal axis A. In other embodiments, the axis D of the drive shaft 504 of the termination assembly 500 may be generally parallel to and offset relative to the longitudinal axis A. Also, in the illustrated embodiment, a distal end (e.g., lowermost end) of the termination tool 108 is spaced apart from the longitudinal axis A by a distance that is shorter than a distance between a distal end (e.g., lowermost end) of the second roller 160*b* and the longitudinal axis A. Therefore, when the stripping tool 100 is performing the stripping operation, the termination tool 108 is closer to the longitudinal axis A, and thus farther from the cable 10, and rides along behind the stripping tool 100 without interfering with the cable 10 or the stripping operation.

Figure 26:
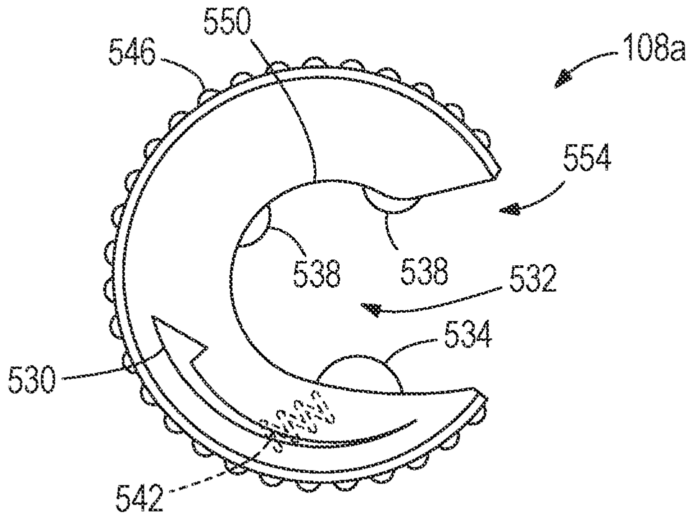
FIG. 26 illustrates a termination tool of the cable stripping system according to a first embodiment for use with the termination assembly of FIG. 24 or 25.

FIG. 26 illustrates a first embodiment of a termination tool 108*a*. The termination tool 108*a* may be used with the termination assembly 500 and the stripping tool 100 shown in FIGS. 24 and 25. The termination tool 108*a* includes a body 530 having a substantially arcuate outer wall 546 and a substantially arcuate inner wall 550. The outer wall 546 is substantially continuous from a first end to a second end, and, similarly, the inner wall 550 is substantially continuous from a first end to a second end. The first end of the outer wall 546 is coupled to the first end of the inner wall 550, and the second end of the outer wall 546 is coupled to the second end of the inner wall 550. The body 530 therefore forms a crescent shape having a gap 554 and surrounding a channel 532. The gap 554 creates an opening that provides access to the channel 532 extending through the body 530. The outer wall 546 is textured and may movably couple to the drive shaft 504 of the termination assembly 500. In other embodiments, the outer wall 546 is textured to provide a grip enhancement for manual operation of the termination tool 108*a*. A blade 534 protrudes inwardly from the inner wall 550 of the body 530 into the channel 532. One or more rollers 538 are similarly positioned on the inner wall 550 of the body 530 to protrude inward into the channel 532. A biasing member 542 (e.g., a spring) is contained within the body and biases the blade 534 into the channel 532. In some embodiments, the roller(s) 538 are similarly biased inward. In some embodiments, there may be more than one blade 534 biased to protrude into the channel 532.

When the user wishes to use the termination tool 108*a*, the termination tool 108*a*is coupled to the stripping tool 100 by the termination assembly 500. The user positions the cable 10 within the channel 532 such that the rollers 538 support and are rotatable relative to cable jacket 26 and the blade 534 is biased (by the spring 542) into the cable jacket 26. As the drive shaft 504 is rotated by the motor 122, 512, the body 530 rotates relative to the cable 10, such that the blade 534 creates the score mark in the cable jacket 26.

Figure 27:
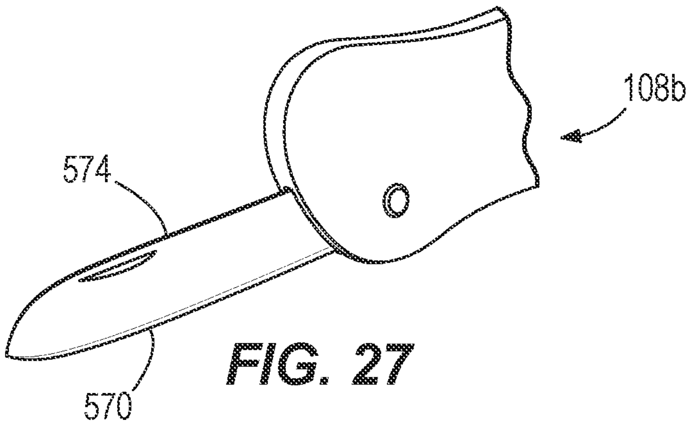
FIG. 27 illustrates a termination tool of the cable stripping system according to a second embodiment for use with the termination assembly of FIG. 24 or 25.

FIG. 27 illustrates a second embodiment of a termination tool 108*b*. The termination tool 108*b* includes a linkage 570 coupled to the drive shaft 504 of the termination assembly 500 to extend therefrom. The linkage 570 includes a first side including a sharp edge or blade 574 and a second side opposite the first side. In some embodiments, the linkage 570 may permanently project from the drive shaft 504 at a non-parallel angle relative to the axis D of the drive shaft 504. In some embodiments, the linkage 570 may be movable between a first or stowed position in which the linkage 570 is parallel to the axis D of the drive shaft 504, and a second or extended position in which the linkage 570 is positioned at a non-parallel angle relative to the axis of the drive shaft 504. Regardless, when the user wishes to use the termination assembly 500, the user positions the blade 574 adjacent to the cable jacket 26 and actuates the drive shaft 504. As the drive shaft 504 is rotated by the motor 122, 512, the linkage 570 rotates relative to the cable 10, such that the blade 574 creates the score mark in the cable jacket 26. In some embodiments, the linkage 570 is supported on a framework (not shown) that is rotatably coupled to the drive shaft, which moves the linkage 570 around the cable 10. In some embodiments, the termination assembly 500 is coupled to the housing 118 in such a way that rotation of the drive shaft 504 rotates the cable stripping tool 100 around the cable 100, dragging the blade 574 around the cable 10 to score the cable jacket 26.

Figure 28:
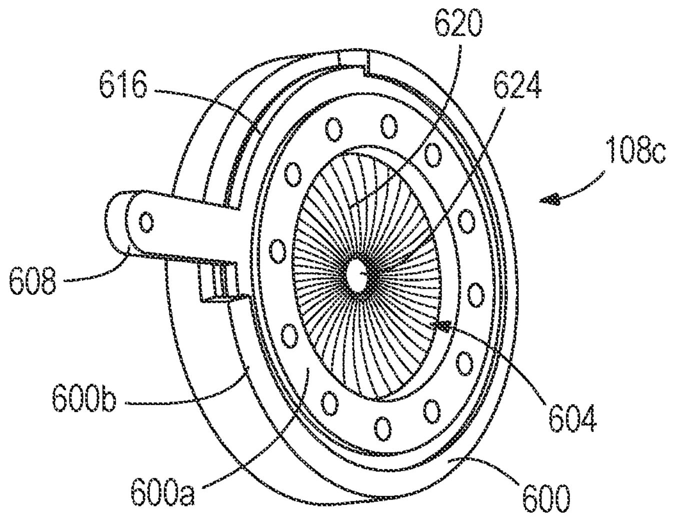
FIG. 28 illustrates a termination tool of the cable stripping system according to a third embodiment for use with the termination assembly of FIG. 24 or 25.

FIG. 28 illustrates a third embodiment of a termination tool 108*c*. The termination tool 108*c* includes a body 600, a plurality of blades 604, and a lever 608 that moves the blades 604 relative to the body 600. In the illustrated embodiment, the body 600 is substantially circular and includes an aperture 624 extending therethrough. The body 600 includes a first body portion 600*a* and a second body portion 600*b* coupled to the first body portion 600*a*. When coupled, the first body portion 600*a* and the second body portion 600*b* define a slot (not shown) that opens to the aperture 624 and receives the plurality of blades 604. The second body portion 600*b* includes a channel 616 that extends at least partially along an outer circumference. The lever 608 projects from the body 600 and is positioned within the channel 616 of the second body portion 600*b*.

In the illustrated embodiment, the blades 604 are movably coupled to the body 600 in a shutter arrangement and are operably coupled to the lever for movement into and out of the aperture 624. Specifically, movement of the lever 608 rotates each blade 604 about a pivot point on the body 600 into and out of the aperture 624. The blades may include an arcuate leading edge 620 that is sharp. The blades 604 are movable between a first position and a second position. In the first position, at least a portion of the sharp edges 620 are mostly received within the slot formed between the body portions 600*a*, 600*b* and collectively define a first diameter. In some embodiments, the first diameter may be substantially the same as the diameter of the aperture 624. Also in the first position, the lever 608 is positioned at a first side of the channel 616. In the second position, the blades 604 are rotated into the aperture 624 and collectively define a second diameter that is smaller than the first diameter. Also in the second position, the lever 608 is positioned at a second, opposite side of the channel. The blades 604 are movable together between the first position and the second position by moving the lever 608 from the first side of the channel 616 to the second side of the channel 616. In the illustrated embodiment, the lever 608 may be operably coupled to the drive shaft 504 of the termination assembly 500. Accordingly, when the user wishes to use the termination assembly 500, the user positions the cable 10 within the aperture while the blades 604 are in the first position. Then, the user actuates the drive shaft 504. As the drive shaft 504 is rotated by the motor 122, 512, the lever 608 moves within the channel 616 such that the blades 604 rotate from the first position towards the second position until the blades 604 come into contact with the cable jacket 26 and create a score mark. The termination tool 108*c* can also be rotated around the cable 10 when the blades 604 contact the cable jacket 26 to create the score mark. This termination tool 108*c* can accommodate different cable 10 widths since the blades 604 can achieve diameters between the first diameter and the second diameter.

While the termination tools 108*a*, 108*b*, 108*c* of FIGS. 26-28 are described and illustrated as being coupled to the stripping tool 100 via the termination assembly 500, it should be understood that each of these tools may be removably coupled or may not be coupled to the stripping tool 100 and may instead be manually operated by a user as a termination tool 108. That is, the stripping tool 100 may be part of a kit of the cable stripping system 50 that includes one or more of the termination tools 108 of FIGS. 26-28 that can be used separately or can be coupled to the termination assembly 500. When included as separate tools, the rotation and other mechanisms achieved by the termination assembly 500 may be manually actuated by the user. For example, the user may rotate the termination tools 108*a*, 108*b* of FIGS. 26 and 27 relative to the cable 10 to create the score mark in the cable jacket 26, and the user may move the lever 608 of termination tool 108*c* between the first and second positions relative to the cable 10 to create the score mark in the cable jacket 26. Additionally, the termination tools 108 of FIGS. 26-28 may be removably coupled to the housing 118 of the stripping tool 100 via a clip or magnet or other suitable retention mechanism (not shown). In this way, the termination tool 108 of each of FIGS. 26-28 may be coupled to the stripping tool 100 when not needed but may be quickly and easily removed from the stripping tool 100 when need to create a score mark.

Figure 29:
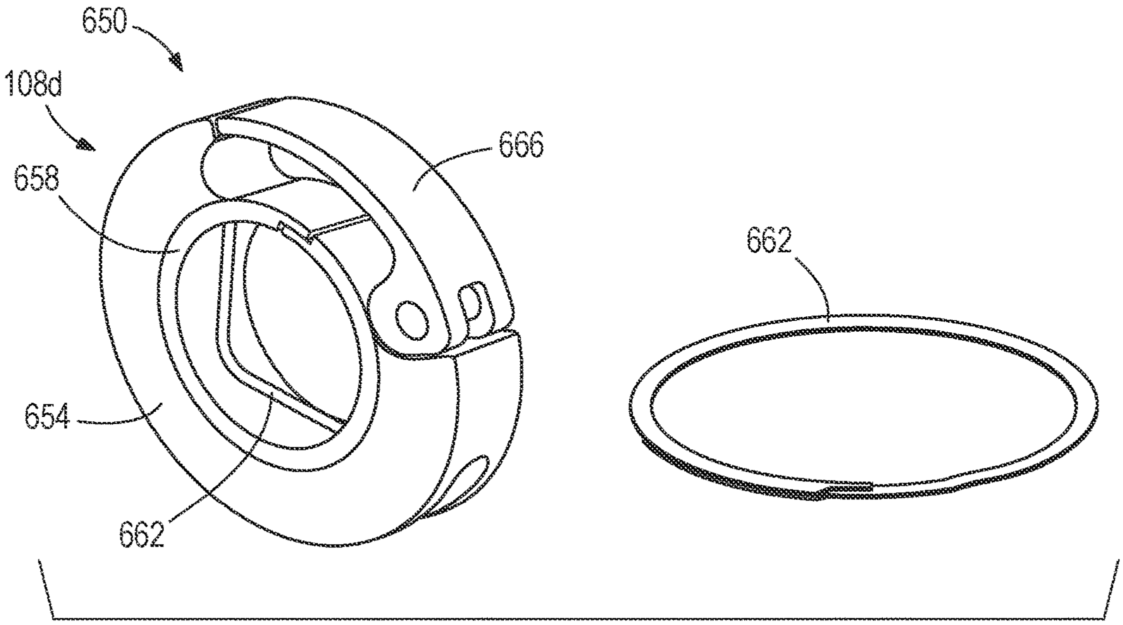
FIG. 29 illustrates a termination tool of the cable stripping system according to a fourth embodiment.

FIG. 29 illustrates a fourth embodiment of a termination tool 108*d* usable separate from the stripping tool 100. This termination tool 108*d* may be removably coupled to the stripping tool 100 or used in a kit of the cable stripping system 50 in a similar way as discussed above. The termination tool 108*d* shown in FIG. 29 includes a collar 650 having an outer collar portion 654, an inner collar portion 658, and a blade 662. The inner collar portion 658 is positioned within the outer collar portion 654. In the illustrated embodiment, both the outer collar portion 654 and the inner collar portion 658 have arcuate shapes and include a first end and a second end spaced apart from the first end by a gap. The gaps of the inner and outer collar portions 654, 658 may be adjacent to one another. The first end of the outer collar portion 654 is fixed relative to the inner collar portion 658, while the second end is movable relative to the inner collar portion 658. The second end of the outer collar portion 654 includes a lever 666 and a ball (not shown). The lever 666 is accessible from an outer surface of the outer collar portion 654. The ball is positioned between the outer collar portion 654 and the inner collar portion 658 and is configured to engage one of a plurality of detents (not shown) on an inner surface of the outer collar portion 654 to adjust the size of the inner collar portion 658.

With continued reference to FIG. 29, the blade 662 is in the form of a spiral and is supported by the inner collar portion 658. The spiral blade 662 has portions that overlap such that the diameter of the blade is adjustable. A sharp or cutting edge of the spiral blade 662 extends into an aperture of the collar 650 from an inner surface of the inner collar portion 658. As the diameter of the inner collar portion 658 is adjusted by the lever 666, the diameter of the blade 662 is adjusted to match the diameter of the inner collar portion 658.

The lever 666 is movable between an open position, in which the ball is movable to engage one of the detents, and a closed position, in which the ball is held in the detent. In the closed position, the lever 666 is positioned adjacent at least a portion of the outer surface of the outer collar portion 654. The ball extends from the detent and pushes against the outer surface of the inner collar portion 658, which adjusts the diameter of the blade 662. In other words, when the lever 666 is in the open position the collar 650 is in an unclamped position, such that the ball of the lever 666 is not positioned within one of the detents and therefore the inner collar portion 658 has a first diameter. The first diameter is a maximum diameter of the inner collar portion 658 and thus, the spiral blade 662. When the lever 666 is in the closed position, the collar 650 is in a clamped position, such that the ball of the lever 666 is positioned within one of the detents and therefore the inner collar portion 658 and spiral blade 662 are biased inwardly by the ball to have a second diameter. The second diameter is less than the first diameter. Each of the detents corresponds to a different second diameter. Accordingly, together the lever 666 and the plurality of detents can adjust the diameter of the inner collar portion 658 and blade 662 based on the diameter of the cable.

When the user wishes to create a score mark on the cable jacket 26 using the termination tool 108*d*, the user moves the lever 666 to its open position and the collar 650 to its unclamped position. Then the user moves the collar 650 along the cable 10 to the inner end. Once at the measured location, the user moves the ball of the lever 666 to the appropriate detent and moves the lever 666 to the closed position to achieve the clamped position. Once in the clamped position, the blade 662 digs into the cable jacket 26. In some embodiments, the clamping pressure of the collar 650 on the blade 662 is enough to create the score mark. In other embodiments, the collar 650 may be rotated around the cable 10, dragging the blade 662 through the cable jacket 26 to create the score mark. In some embodiments, the collar 650 can then be removed prior to the cable stripping process. In other embodiments, the collar 650 may remain there as an indicator of the location of the score mark or as a physical stop that will cause the stripping tool 100 to stop moving along the cable (e.g., either by manually stopping the tool through a button on the tool or on the remote control 188 or by automatically stopping the tool via a sensor on the collar 650 that communicates with the PCB of the stripping tool 100).

Figure 30:
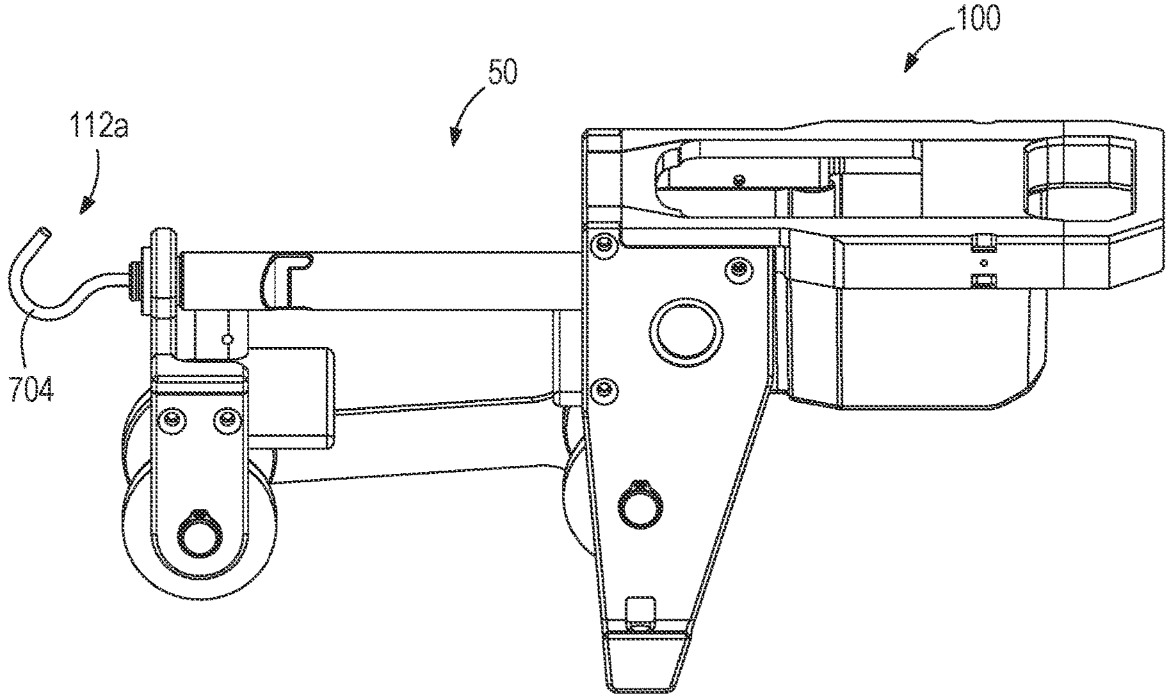
FIG. 30 illustrates the cable stripping system including the stripping tool of FIG. 2 and a braid tool according to a first embodiment coupled to the mandrel of the stripping tool.
Figure 31:
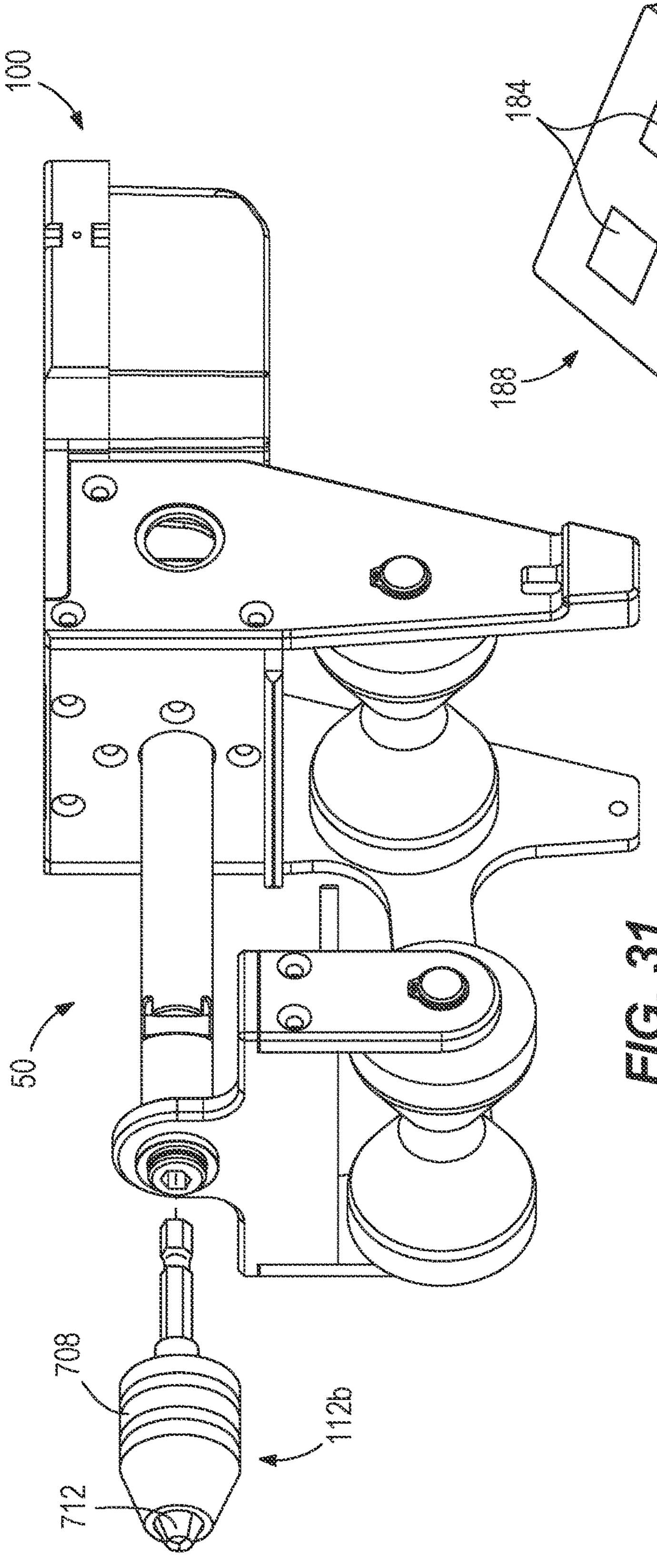
FIG. 31 illustrates the cable stripping system including the stripping tool of FIG. 2 and a braid tool according to a second embodiment coupled to the mandrel of the stripping tool.
Figure 32:
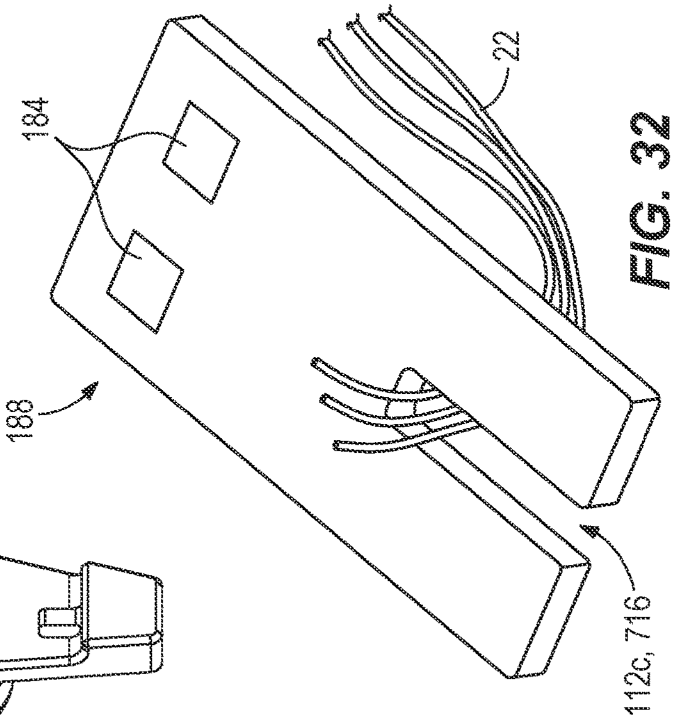
FIG. 32 illustrates an exemplary remote control for controlling the stripping tool of FIG. 2 including a braid tool of the cable stripping system according to a third embodiment.

FIGS. 30-32 illustrate embodiments of the braid tool 112 for use with the stripping tool 100. In the embodiments of FIGS. 30-31, the braid tools 112*a*, 112*b* are each coupled to and extend from the mandrel 126. As shown, the braid tools 112*a*, 112*b* each include a first end that is positioned and coupled within the second bore 206 (FIG. 5B) at the second end 132 of the mandrel 126 and a second end opposite the first end. In the braid tool 112*a* shown in FIG. 30, the second end of the braid tool 112*a* is a hook 704, and the plurality of neutral wires 22 of the cable 10 may be coupled to the hook 704 prior to being braided or twisted. As shown in FIG. 31, the second end of the braid tool 112*b* is a chuck 708, and the neutral wires 22 may be inserted into a bore 712 formed in the chuck 708 and may be clamped together prior to being braided or twisted. In either case, once the neutral wires 22 are secured to the braid tool 112, the motor 122 can be actuated to rotate the mandrel 126 and therefore twist or braid the neutral wires 22 together to create a strand.

In some embodiments, after the cable stripping operation has terminated and the neutral wires are available, the housing 118, including the motor 122 and battery pack 130, may be removable from the frame 114 and the mandrel 126. In such case, a braid tool 112 may be coupled to the motor 122 in place of the mandrel 126. Accordingly, the braid tool 112 may be rotated by the motor 122 to braid or twist the neutral wires 22 secured to the braid tool 112.

In a third embodiment of a braid tool 112*c*, shown in FIG. 32, the braid tool 112*c* may be integrated with the remote control 188. The remote control 188 may include a slot 716 extending into the remote control 188. The slot 716 may be configured to receive the neutral wires 22. The user may then manually rotate the remote control 188 to braid or twist the neutral wires 22 together.

In some embodiments, the user may use any combination of starter tool 104, termination tool 108, and braid tool 112 discussed above. Similarly, a cable stripping tool may include any combination or sub combination of the starter tools 104, termination tools 108, and braid tools 112 discussed above. For example, in some embodiments, a cable stripping tool may include one of the starter tools 104 and one of the termination tools 108, but not a braid tool. Alternatively, a cable stripping tool may include one of the starter tools 104 and one of the braid tools 112, but not a termination tool, or may include one of the termination tools 108 and one of the braid tools 112, but not a starter tool. The user may use one of the starter tools 104 to start the stripping process, one of the termination tools 108 to create the score marks that terminates the stripping process, the stripping tool 100 to strip the cable jacket 26, and one of the braid tools 112 to braid or twist the neutral wires 22.

Although the invention has been described in detail with reference to certain preferred embodiments, variations and modifications exist within the scope and spirit of one or more independent aspects of the invention as described.

What is claimed is:

1. A cable stripping tool for removing a cable jacket from a cable to expose a plurality of neutral wires, the cable stripping tool comprising:
- a housing;
- a frame coupled to the housing and configured to support the cable stripping tool on the cable;
- a mandrel extending from the housing and rotatable about a first axis, the mandrel configured to engage a starter wire of the plurality of neutral wires;
- a motor supported by the housing and operably coupled to the mandrel to rotate the mandrel about the first axis, wherein rotation of the mandrel by the motor winds the starter wire around the mandrel such that the cable jacket is torn by the starter wire; and a termination tool supported by the housing at an opposite end of the housing from the frame and configured to score the cable jacket at a desired distance from an end of the cable.

2. The cable stripping tool of claim 1, wherein the termination tool is coupled to the housing by a termination assembly including a drive shaft configured to rotate about a second axis.

3. The cable stripping tool of claim 2, wherein the termination tool includes a channel configured to receive a portion of cable, and a blade extending into the channel, and wherein rotation of the drive shaft is transmitted to the termination tool, such that the blade is rotated around the cable and contacts the cable to score the cable jacket.

4. The cable stripping tool of claim 2, wherein the drive shaft is operably coupled to the motor.

5. The cable stripping tool of claim 2, wherein the drive shaft is operably coupled to a second motor configured to rotate the drive shaft about the second axis.

6. The cable stripping tool of claim 1, wherein the termination tool includes a blade and is movable between a first position, in which the blade is spaced from the cable jacket, and a second position, in which the blade is in contact with the cable jacket.

7. The cable stripping tool of claim 1, wherein the termination tool includes a blade having an adjustable diameter.

8. The cable stripping tool of claim 1, further comprising:

a starter tool configured to extract the starter wire from the end of the cable; and a braid tool configured to wind the plurality of neutral wires exposed by removal of the cable jacket into a strand.

9. A cable stripping tool for removing a cable jacket from a cable to expose a plurality of neutral wires, the cable stripping tool comprising:

a housing;

a frame coupled to the housing and configured to support the cable stripping tool on the cable;

a mandrel extending from the housing and rotatable about a first axis with respect to the housing;

a starter tool supported by one of the mandrel and housing and configured to expose an end of a starter wire of the plurality of neutral wires;

a wire slot positioned on the mandrel, the wire slot configured to engage the starter wire; and a motor supported by the housing and operably coupled to the mandrel to rotate the mandrel about the first axis, wherein rotation of the mandrel by the motor winds the starter wire around the mandrel such that the cable jacket is torn by the starter wire.

10. The cable stripping tool of claim 9, wherein the mandrel extends along the first axis between a first end and a second end, opposite the first end, and wherein the first end of the mandrel is removably coupled to the motor.

11. The cable stripping tool of claim 10, wherein the starter tool is coupled to the mandrel adjacent the second end and includes a blade adjacent the wire slot, and wherein the blade is configured to dig into the cable jacket to expose the end of the starter wire.

12. The cable stripping tool of claim 9, wherein the starter tool includes a linkage coupled to the mandrel for movement between an extended position, in which a hook of the linkage may be used to engage the end of the starter wire, and a stowed position, in which the linkage is moved toward the mandrel.

13. The cable stripping tool of claim 12, wherein the linkage includes a first link extending between a first end, pivotably coupled to the mandrel, and a second end including the hook.

14. The cable stripping tool of claim 12, wherein the linkage is configured to automatically move from the extended position to the stowed position when the mandrel is rotated about the first axis.

15. The cable stripping tool of claim 9, wherein the starter tool includes an aperture having sharp edges, and wherein the aperture is configured to be positioned around the starter wire.

16. The cable stripping tool of claim 15, wherein the starter tool includes a handle, a shaft extending from the handle to a working end, and the aperture extends through the working end, and wherein the handle includes a remote control configured to control operation of the motor.

17. The cable stripping tool of claim 15, wherein the aperture extends through an end of the mandrel.

18. The cable stripping tool of claim 9, wherein the starter tool includes a collar having an abrasive inner surface configured to wear away the cable jacket at an outer end of the cable.

19. A cable stripping tool for removing a cable jacket from a cable to expose a plurality of neutral wires, the cable stripping tool comprising:

a housing;

a frame coupled to the housing and configured to support the cable stripping tool on the cable;

a mandrel extending from the housing and rotatable about a first axis with respect to the housing; the mandrel including a slot configured to engage a starter wire of the plurality of neutral wires;

a motor supported by the housing and operably coupled to the mandrel to rotate the mandrel about the first axis, wherein rotation of the mandrel by the motor winds the starter wire around the mandrel such that the cable jacket is torn by the starter wire; and a braid tool configured to wind the plurality of neutral wires exposed by removing the cable jacket together into a strand, wherein the braid tool is coupled to an end of the mandrel opposite the motor.

20. The cable stripping tool of claim 19, wherein rotation of the mandrel by the motor rotates the braid tool to wind the plurality of neutral wires.

21. The cable stripping tool of claim 19, wherein the braid tool includes a hook.

22. The cable stripping tool of claim 19, wherein the braid tool includes a chuck.

* * * * *